(12) United States Patent
Kim et al.

(10) Patent No.: US 12,488,825 B2
(45) Date of Patent: Dec. 2, 2025

(54) MEMORY DEVICE AND OPERATION METHOD THEREOF

(71) Applicant: SAMSUNG ELECTRONICS CO., LTD., Suwon-si (KR)

(72) Inventors: Dongha Kim, Suwon-si (KR); Tae-Kyeong Ko, Suwon-si (KR); Do-Han Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 140 days.

(21) Appl. No.: 18/422,770

(22) Filed: Jan. 25, 2024

(65) Prior Publication Data
US 2024/0339145 A1  Oct. 10, 2024

(30) Foreign Application Priority Data
Apr. 10, 2023 (KR) ........................ 10-2023-0046930

(51) Int. Cl.
 *G11C 11/00* (2006.01)
 *G11C 11/406* (2006.01)
 *G11C 11/4078* (2006.01)

(52) U.S. Cl.
 CPC .. *G11C 11/40615* (2013.01); *G11C 11/40622* (2013.01); *G11C 11/4078* (2013.01)

(58) Field of Classification Search
 CPC ........ G11C 11/40622; G11C 11/40615; G11C 11/40611; G11C 11/408; G11C 11/40603; G11C 11/4078; G11C 11/4087; G11C 11/40618; G11C 11/4085; G11C 11/406; G11C 7/24; G11C 7/1063; G11C 11/4096; G11C 11/4094; G11C 2211/4062; G11C 11/4093; G11C 2029/0409; G11C 29/4401; G11C 29/52; G11C 29/76; G11C 29/783; G11C 2029/0411; G11C 2029/1202;
(Continued)

(56) References Cited

U.S. PATENT DOCUMENTS 7,742,355 B2  6/2010 Kohler et al.
9,076,549 B2  7/2015 Kim et al.
(Continued)

FOREIGN PATENT DOCUMENTS

KR  10-2013-0117198  10/2013
KR  10-2014-0113191   9/2014
KR  10-2017-0118484  10/2017

*Primary Examiner* — Thong Q Le
(74) *Attorney, Agent, or Firm* — Fish & Richardson P.C.

(57) ABSTRACT

The present disclosure relates to operation methods of a memory device including multiple rows each including multiple memory cells. One example method includes receiving an active command for a first row from a memory controller, reading a first count from a per-row hammer tracking (PRHT) region of the first row, updating the first count to generate a first updated count, comparing the first updated count with one of first and second thresholds to generate a comparison result, wherein when the first row is adjacent to the given row, the first updated count is compared with the first threshold and when the first row is not adjacent to the given row, the first updated count is compared with the second threshold, outputting a target row address based on the comparison result, and performing a row hammer mitigation operation on a row corresponding to the target row address.

20 Claims, 20 Drawing Sheets

(58) Field of Classification Search
CPC ... G11C 2211/4065; G11C 29/20; G11C 7/02; G11C 8/06; G11C 8/08; G11C 11/4072; G11C 11/4082; G11C 29/42; G11C 29/787; G11C 8/04; G11C 8/14; G11C 11/4063; G11C 11/4076; G11C 17/16; G11C 17/165; G11C 2029/4402; G11C 29/18; G11C 5/04; G11C 7/10; G11C 7/109; G11C 8/18; G11C 8/20

See application file for complete search history.

(56) References Cited

U.S. PATENT DOCUMENTS

| | | |
|---|---|---|
| 9,466,351 B2 | 10/2016 | Jeong |
| 9,627,026 B1 | 4/2017 | Kang et al. |
| 10,236,035 B1 | 3/2019 | Lee et al. |
| 10,825,534 B2 | 11/2020 | Nale |
| 2018/0342283 A1 | 11/2018 | Lee et al. |
| 2021/0365316 A1 | 11/2021 | Nale et al. |
| 2022/0121398 A1* | 4/2022 | Nale ..................... G06F 3/0659 |
| 2023/0020753 A1 | 1/2023 | Fujiwara et al. |
| 2023/0021622 A1 | 1/2023 | Cho et al. |

* cited by examiner

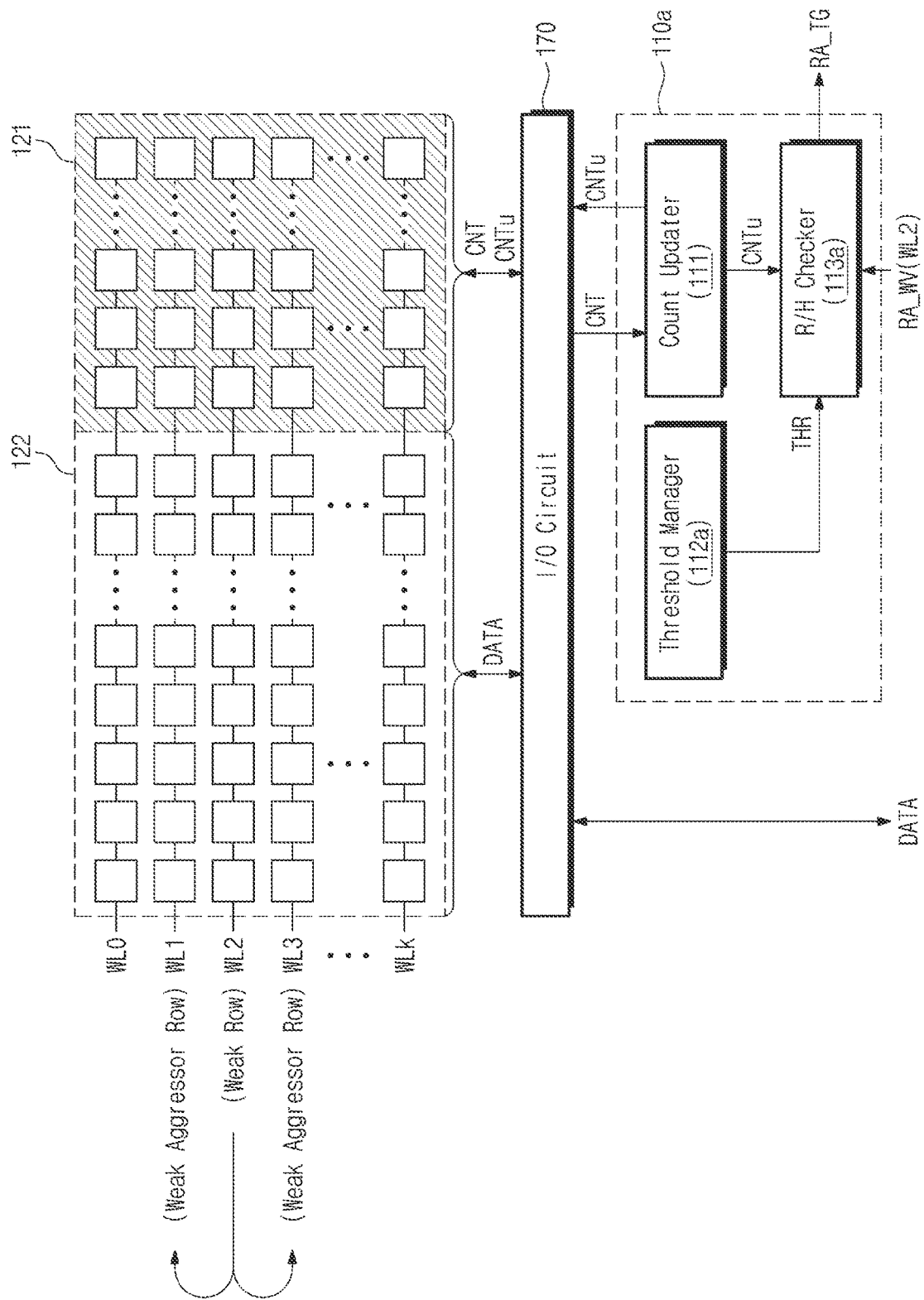

MEMORY DEVICE AND OPERATION METHOD THEREOF

CROSS-REFERENCE TO RELATED APPLICATION

This application claims priority to Korean Patent Application No. 10-2023-0046930, filed on Apr. 10, 2023, in the Korean Intellectual Property Office, the disclosure of which is hereby incorporated by reference in its entirety.

BACKGROUND

A semiconductor memory is classified as a volatile memory, which loses data stored therein when a power is turned off, such as a static random access memory (SRAM) or a dynamic random access memory (DRAM) or a non-volatile memory, which retains data stored therein even when a power is turned off, such as a flash memory, a phase-change RAM (PRAM), a magnetic RAM (MRAM), a resistive RAM (RRAM), or a ferroelectric RAM (FRAM).

The DRAM is being widely used as a system memory of a mobile device or a computer device. The DRAM includes a plurality of memory cells connected to a plurality of wordlines. The DRAM performs various operations by activating a selected wordline in response to an active command received from a memory controller. When a specific wordline is frequently accessed, data stored in memory cells of a wordline adjacent to the specific wordline may be lost. This phenomenon is called a row hammer and may be used for a malicious attack on the computing device or may cause a reliability issue in a miniaturized DRAM.

SUMMARY

The present disclosure relates to a memory device, such as a semiconductor device, and an operation method thereof.

In some implementations, an operation method of a memory device that includes a plurality of rows, each row including a plurality of memory cells, includes receiving an active command for a first row of the plurality of rows from a memory controller; reading a first count from a per-row hammer tracking (PRHT) region of the first row; updating the first count to generate a first updated count; comparing the first updated count with one of a first threshold and a second threshold greater than the first threshold based on the first row and a given row to generate a comparison result wherein when the first row is adjacent to the given row, the first updated count is compared with the first threshold and when the first row is not adjacent to the given row, the first updated count is compared with the second threshold; outputting a target row address corresponding to the first row based on the comparison result; and performing a row hammer mitigation operation on a row corresponding to the target row address.

In some implementations, an operation method of a memory device includes generating a first count by counting a number of times a first row is activated, wherein the first row comprises a plurality of first memory cells; when the first count reaches a first threshold, performing a row hammer mitigation operation on a first adjacent row, the first adjacent row being adjacent to the first row; generating a second count by counting a number of times a second row is activated, wherein the second row comprises a plurality of second memory cells; and when the second count reaches a second threshold smaller than the first threshold, performing the row hammer mitigation operation on a second adjacent row, the second adjacent row being adjacent to the second row.

In some implementations, memory device includes first normal memory cells connected to a first wordline and configured to store user data; first per-row hammer tracking (PRHT) memory cells connected to the first wordline and configured to store a first count indicating a number of times the first wordline is activated; an input/output circuit connected to the first normal memory cells and the first PRHT memory cells through a plurality of bitlines; a memory circuit configured to store information about a victim row address; a PRHT logic circuit configured to receive the first count from the input/output circuit, when the first wordline is activated, to update the first count, to compare the first updated count with a threshold, and to output a row address of a second wordline adjacent to the first wordline as a target row address; and a refresh managing circuit configured to perform a refresh operation with respect to the second wordline based on the target row address, wherein the PRHT logic circuit adjusts the threshold based on information about the victim row address.

BRIEF DESCRIPTION OF THE FIGURES

The above and other objects and features of the present disclosure will become apparent by describing in detail thereof with reference to the accompanying drawings.

FIGS. 9A and 9B are example diagrams for describing an operation of a memory device of FIG. 2.

DETAILED DESCRIPTION

Hereinafter, example implementations are described in detail and clearly to such an extent that an ordinary one in the art easily carries out the present disclosure.

Figure 1:
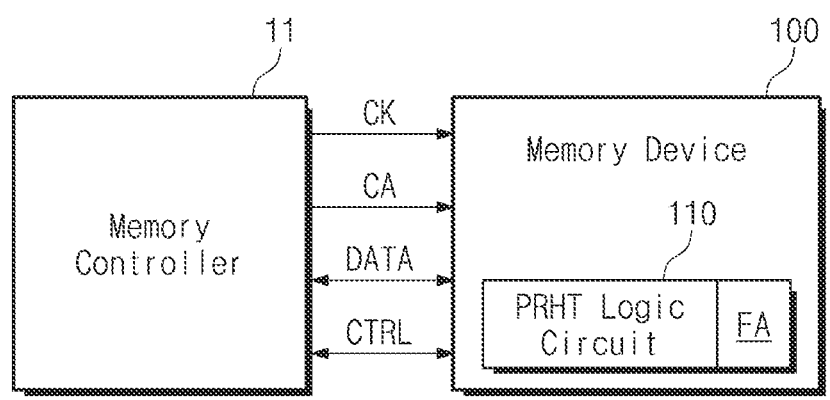
FIG. 1 is a block diagram illustrating an example of a memory system.

FIG. 1 is a block diagram illustrating an example of a memory system. Referring to FIG. 1, a memory system 10 may include a memory controller 11 and a memory device 100. In an example, the memory system 10 may be one of information processing devices, which are configured to process a variety of information and to store the processed information, such as a personal computer (PC), a laptop, a server, a workstation, a smartphone, a tablet PC, a digital camera, and a black box.

The memory controller 11 may store data in the memory device 100 or may read data stored in the memory device 100. For example, the memory controller 11 may transmit a clock signal CK and a clock/address signal CA to the memory device 100 and may exchange data "DATA" with the memory device 100. In an example, the memory controller 11 may exchange the data "DATA" with the memory device 100 by using a data signal DQ and a data strobe signal DQS. The memory controller 11 may exchange a control signal CTRL with the memory device 100. In an example, the memory controller 11 and the memory device 100 may communicate with each other based on the DDR interface or the LPDDR interface, but the present disclosure is not limited thereto.

The memory device 100 may operate under control of the memory controller 11. In an example, the memory device 100 may be a dynamic random access memory (DRAM) device. However, the present disclosure is not limited thereto. For example, the memory device 100 may include a volatile memory such as a static RAM (SRAM) or a nonvolatile memory device such as a flash memory, a phase-change RAM (PRAM), or a resistive RAM (RRAM).

In an example, the memory device 100 may include a plurality of rows. The plurality of rows may respectively correspond to wordlines, and each of the plurality of rows may include memory cells connected to the corresponding wordline. Below, to describe the present disclosure easily, the terms "row", "row address" and "wordline" may be interchangeably used. Depending on the context, the row, the row address, and the wordline may be understood as having similar meanings.

The memory device 100 may include a per-row hammer tracking (PRHT) logic circuit 110. The PRHT logic circuit 110 may count and manage the number of times (hereinafter referred to as an "active count" or the "number of times of activation) that each row of the memory device 100 is activated. When the active count of the specific row reaches a threshold (i.e., when row hammering occurs at the specific row), data of rows adjacent to the specific row may be lost. To prevent the above issue, when the active count of the specific row reaches the threshold, the PRHT logic circuit 110 may generate a victim row address such that the refresh operation is performed with respect to rows (i.e., victim rows) adjacent to the specific row. The memory device 100 may perform the refresh operation with respect to the row corresponding to the victim row address. In an example, the refresh operation for the victim row address may be referred to as a "row hammer mitigation operation".

Below, for convenience of description, the terms "weak victim row", "weak victim row address", "weak aggressor row", "weak aggressor row address", etc. are used. The weak victim row may refer to a row including memory cells with relatively weak cell strength from among the plurality of rows of the memory device 100. The weak victim row address may refer to a row address of the weak victim row in the memory device 100. The weak aggressor row may refer to a row (e.g., a row adjacent to the weak victim row) capable of having an influence of row hammering on the weak victim row. The weak aggressor row address may refer to a row address of the weak aggressor row. The terms "weak victim row", "weak victim row address", "weak aggressor row", "weak aggressor row address", etc. may be used in units of wordline in the memory device 100. That is, the weak victim row may refer to a weak victim wordline, and the weak aggressor row may refer to a weak aggressor wordline. The weak victim row address may indicate a location of the weak victim wordline, and the weak aggressor row address may indicate a location of the weak aggressor row wordline. The terms are provided for describing the present disclosure easily, and the present disclosure is not limited thereto. In an example, that the cell strength is weak may mean that a memory cell or a row is relatively vulnerable to row hammering. For example, it is assumed that the "n activates" are generated with respect to the first row of the memory device 100. That the "active" for the first row is generated means that an active command for the first row or a wordline corresponding to the first row is received and the first row or the wordline corresponding to the first row is activated in response to the active command. That is, that the "n actives" are generated with respect to the first row of the memory device 100 means that the first row or the wordline corresponding to the first row is activated n times.

In this case, memory cells of the second row adjacent to the first row may lose data stored therein, due to the "n actives" of the first row (i.e., due to the influence of row hammering). In contrast, memory cells of the third row adjacent to the first row may maintain data stored therein, even in the "n actives" of the first row (i.e., even in the influence of row hammering). In this case, the memory cells of the second row have relatively weak cell strength compared to the memory cells of the third row. In other words, the memory cells of the third row have strong (or robust) cell strength compared to the memory cells of the second row. As described above, a row (i.e., a weak victim row) including memory cells with relatively weak cell strength may lose data stored therein even though the number of "activates" of an adjacent row is relatively small.

In general, to guarantee the reliability of data of memory cells, a threshold for determining row hammering is determined based on memory cells with weakest cell strength. In this case, the reliability of data of memory cells with relatively weak cell strength may be guaranteed. In contrast, because the same threshold (i.e., the threshold that is based on memory cells with weak cell strength) is used to determine row hammering with respect to memory cells with relatively strong cell strength or rows including memory cells with relatively strong cell strength, the refresh operation may be unnecessarily performed with respect to memory cells with relatively strong cell strength. In this case, the performance of the memory device 100 may be reduced.

In some implementations, the threshold for determining row hammering is determined based on normal memory cells of the memory device 100 (or memory cells with relatively strong cell strength). In this case, the reliability of data stored in memory cells with relatively weak cell strength may not be guaranteed. To solve the above issue, the PRHT logic circuit 110 of the memory device 100 may change (or adjust) a threshold corresponding to a row (i.e., a weak victim row) including memory cells with relatively weak cell strength. In this case, because the refresh operation of the relatively weak memory cells is performed more frequently, the reliability of data may be guaranteed.

For example, the memory device 100 may include a fuse array FA. The fuse array FA may store a weak victim row address of a weak victim row among the plurality of rows (or wordlines) of the memory device 100. In an example, the weak victim row address may be obtained through the test operation for the memory device 100 and may be stored in the fuse array FA.

The PRHT logic circuit 110 may receive the weak victim row address from the fuse array FA. The PRHT logic circuit 110 may change the threshold based on the weak victim row address. In this case, the threshold corresponding to the weak aggressor row determined based on the weak victim row may be changed. As such, because the row hammer mitigation operation is performed relatively frequently with respect to the weak victim rows, the reliability of the memory device 100 may be improved. Also, because the number of row hammer mitigation operations performed with respect to rows being not the weak victim row (i.e., rows with relatively strong cell strength) decreases, the performance of the memory device 100 may be improved. An operation and a structure of the memory device 100 will be described in detail with reference to the following drawings.

Figure 2:
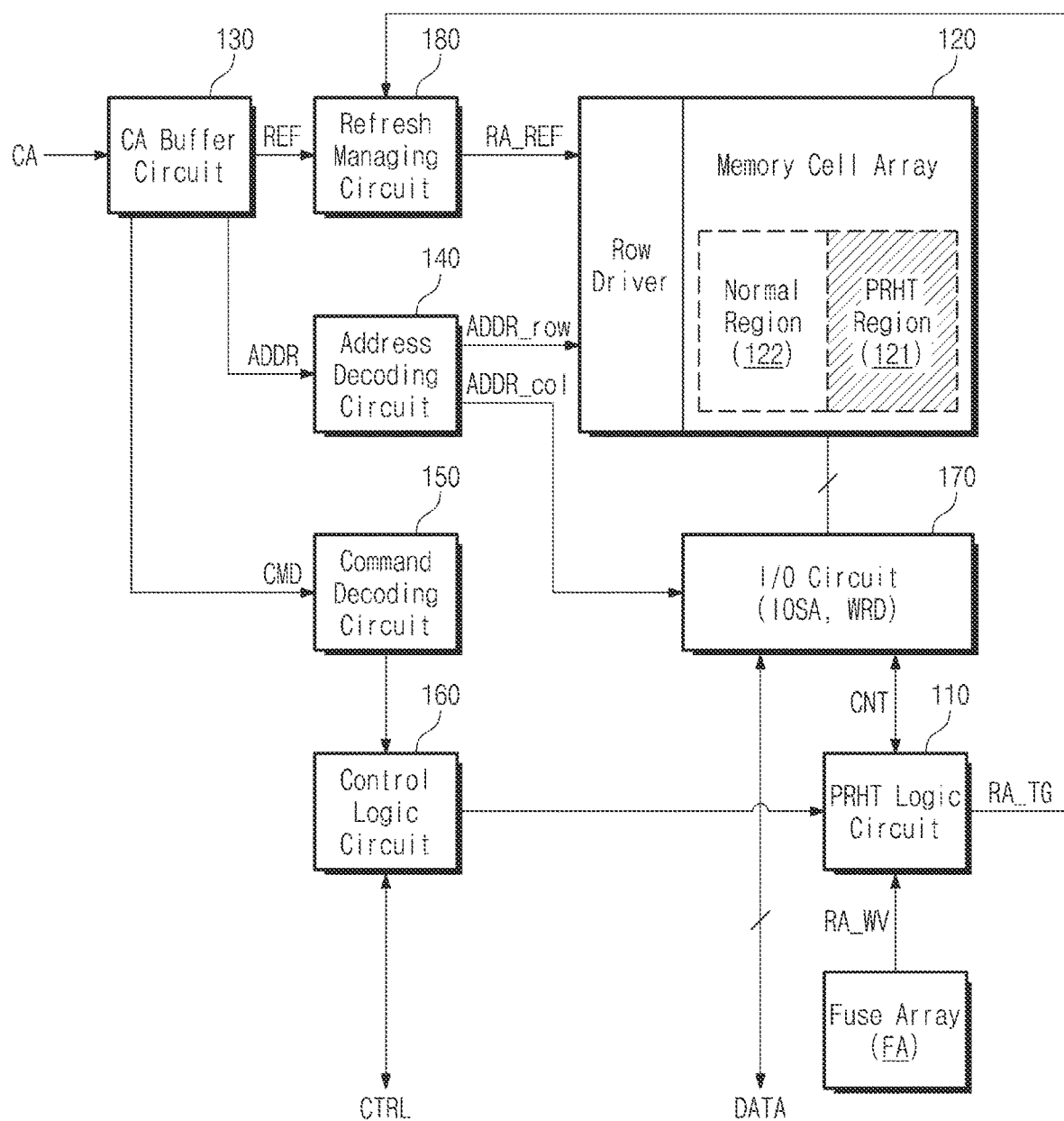
FIG. 2 is a block diagram illustrating an example of a memory device of FIG. 1.

FIG. 2 is a block diagram illustrating an example of a memory device of FIG. 1. Referring to FIGS. 1 and 2, the memory device 100 may include the PRHT logic circuit 110, a memory cell array 120, a CA buffer circuit 130, an address decoding circuit 140, a command decoding circuit 150, a control logic circuit 160, an input/output circuit 170, a refresh managing circuit 180, and the fuse array FA.

The PRHT logic circuit 110 may be configured to manage the number of times of activation (or an active count) of each row of the memory cell array 120. The PRHT logic circuit 110 may receive a weak victim row address RA_WV from the fuse array FA. The PRHT logic circuit 110 may determine a weak aggressor row based on the weak victim row address RA_WV. The PRHT logic circuit 110 may change a row hammer threshold for the weak victim row. The PRHT logic circuit 110 may output a target row address RA_TG based on a count CNT (indicating the number of times of activation) (or an active count CNT) read from the memory cell array 120 and the row hammer threshold. The target row address RA_TG may be provided to the refresh managing circuit 180.

The memory cell array 120 may include a plurality of memory cells. The plurality of memory cells may be arranged along a row direction and a column direction. The plurality of memory cells may be connected to a plurality wordlines and a plurality of bitlines. In an example, each of the plurality of memory cells may be a dynamic random access memory (DRAM) cell that includes an access transistor and a storage capacitor. In an example, the wordlines may be driven by a row driver.

In an example, the memory cell array 120 may include a PRHT region 121 and a normal region 122. The PRHT region 121 may include at least one memory cell (or a PRHT memory cell) configured to store the count CNT of each row. The normal region 122 may include memory cells (e.g., normal memory cells) configured to store the data "DATA". For example, the first row may include a plurality of memory cells. The plurality of memory cells of the first row may be connected to the same wordline. Some of the plurality of memory cells of the first row may be included in the normal region 122, and the others thereof may be included in the PRHT region 121. The memory cells included in the normal region 122 may be configured to store the data "DATA". The memory cells included in the PRHT region 121 may be configured to store the count CNT indicating the number of times of activation of the first row.

The CA buffer circuit 130 may receive the command/address CA from the memory controller 11. The CA buffer circuit 130 may be configured to buffer the received signals.

The address decoding circuit 140 may receive an address ADDR from the CA buffer circuit 130 and may decode the received address ADDR. Based on a decoding result, the address decoding circuit 140 may provide a row address ADDR_row to the row driver and may provide a column address ADDR_col to the input/output circuit 170.

The command decoding circuit 150 may receive a command CMD from the CA buffer circuit 130 and may decode the received command CMD. The command decoding circuit 150 may provide a decoding result to the control logic circuit 160.

The control logic circuit 160 may control an overall operation of the memory device 100 based on the decoding result of the command decoding circuit 150.

The input/output circuit 170 may be connected to the memory cell array 120 through the bitlines. The input/output circuit 170 may control the bitlines based on the column address ADDR_col from the address decoding circuit 140. In an example, the input/output circuit 170 may include an input/output sense amplifier IOSA used in the read operation of the memory device 100 and a write driver WRD used in the write operation of the memory device 100.

The refresh managing circuit 180 may control the refresh operation of the memory device 100. For example, the refresh managing circuit 180 may generate a refresh row address RA_REF in response to a refresh command REF. The refresh row address RA_REF may be provided to the row driver. The refresh operation for the memory cells of the memory cell array 120 may be sequentially performed based on the refresh row address RA_REF.

In an example, the refresh managing circuit 180 may receive the target row address RA_TG from the PRHT logic circuit 110. The refresh managing circuit 180 may generate the refresh row address RA_REF such that the refresh operation is performed based on the target row address RA_TG.

In an example, the description is given as the refresh command REF is received from the CA buffer circuit 130, but the present disclosure is not limited thereto. For example, the refresh command REF may be provided from the command decoding circuit 150.

In an example, the input/output circuit 170 may write the data "DATA" received from the memory controller 11 in the normal region 122 of the memory cell array 120. The input/output circuit 170 may transmit the data "DATA" read from the normal region 122 of the memory cell array 120 to the memory controller 11. The input/output circuit 170 may provide the count CNT read from the PRHT region 121 of the memory cell array 120 to the PRHT logic circuit 110. The input/output circuit 170 may write or rewrite the count CNT (or an updated count) provided from the PRHT logic circuit 110 in the PRHT region 121.

The fuse array FA may store the weak victim row address RA_WV. For example, the fuse array FA may include a memory circuit or a fuse circuit configured to store a variety of information through the fuse setting. The weak victim row address RA_WV may be stored in the fuse array FA through the fuse setting. In the initialization operation of the memory device 100, the fuse array FA may provide the weak victim row address RA_WV to the PRHT logic circuit 110. In an example, the weak victim row address RA_WV may be obtained in the process of testing the memory device 100 and may be stored in the fuse array FA.

In an example, the description is given as the weak victim row address RA_WV is stored in the fuse array FA, but the present disclosure is not limited thereto. For example, the weak victim row address RA_WV may be stored in a separate memory circuit (e.g., a nonvolatile memory such as an MRAM, an RRAM, or a flash memory). Alternatively, the weak victim row address RA_WV may be provided from the memory controller 11 or any other external device in the initialization operation of the memory device 100.

Figure 3:
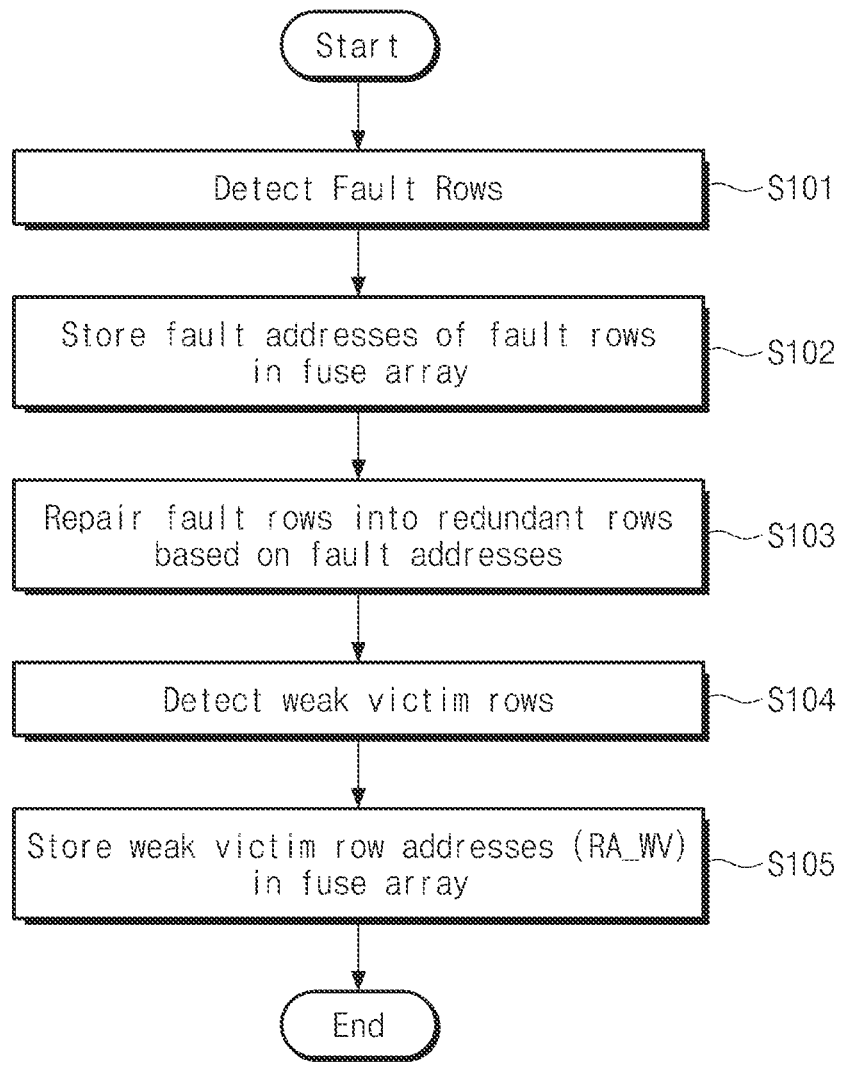
FIG. 3 is an example flowchart for describing a test operation associated with a memory device of FIG. 2.

FIG. 3 is an example flowchart for describing a test operation associated with a memory device of FIG. 2. In an example, an operation according to the flowchart of FIG. 3 may be performed by a separate test device configured to test the memory device 100. In an example, the test device may test the memory device 100 in the process of manufacturing the memory device 100.

Referring to FIGS. 2 and 3, in operation S101, the test device may detect fault rows among the plurality of rows of the memory device 100. For example, the fault row may indicate a row, which includes a memory cell operating abnormally, from among the plurality of rows. The test device may detect the fault rows among the plurality of rows by testing the memory device 100.

In operation S102, the test device may store fault row addresses of the fault rows in the fuse array FA of the memory device 100. For example, the test device may store the fault row address in the fuse array FA through the fuse setting of the fuse array FA.

In operation S103, the test device may perform a repair operation on the memory device 100. For example, the test device may perform the repair operation on the memory device 100 such that the fault rows of the memory device 100 are replaced with redundant rows of the memory device 100. In an example, the repair operation may be performed by the memory device 100, based on the fault row addresses stored in the fuse array FA. In an example, when the access to the fault row address is requested, the memory device 100 may access the redundant row that is used to replace the fault row. In this case, the memory device 100 may operate normally.

In operation S104, the test device may detect weak victim rows among the plurality of rows of the memory device 100. For example, the weak victim row may indicate a row, which includes memory cells performing the normal operation but having relatively weak cell strength, from among the plurality of rows of the memory device 100. That is, unlike the fault row described with reference to operation S101, the access to the weak victim rows detected in operation S104 may be performed normally. However, data stored at the weak victim rows may have relatively weak cell strength or may have a relatively short retention time.

In operation S105, the test device may store the weak victim row addresses RA_WV of the weak victim rows in the fuse array FA of the memory device 100. For example, the test device may store the weak victim row address RA_WV in the fuse array FA through the fuse setting.

As described above, the fuse array FA of the memory device 100 may store a variety of information detected in the test process. The weak victim row address RA_WV may be different from a fault row address used for the repair operation.

In an example, the test operation associated with the memory device 100 is described with reference to FIG. 3, but the present disclosure is not limited thereto. The test operation associated with the memory device 100 may further include various other test processes.

Figure 4:
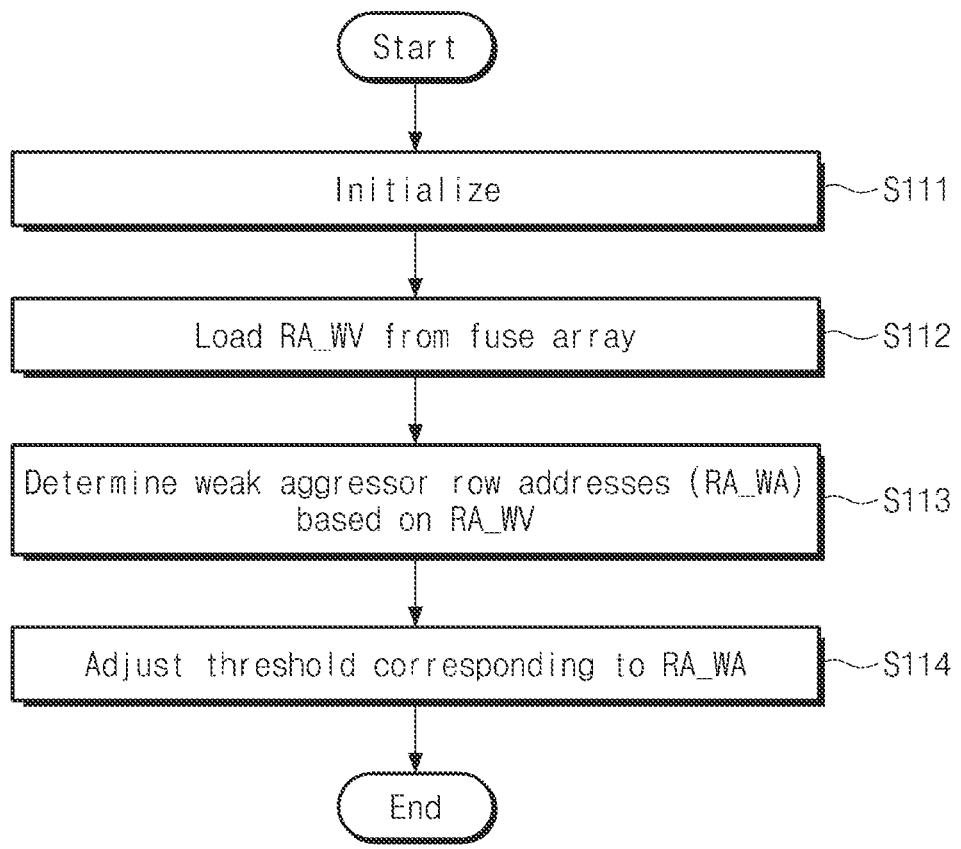
FIG. 4 is an example flowchart illustrating an operation of a memory device of FIG. 2.

FIG. 4 is an example flowchart illustrating an operation of a memory device of FIG. 2. Referring to FIGS. 2 and 4, in operation S111, the memory device 100 may perform the initialization operation. For example, the memory device 100 may perform the initialization operation under control of the memory controller 11.

In operation S112, the memory device 100 may load the weak victim row address RA_WV from the fuse array FA. For example, as described above, the fuse array FA may store the weak victim row address RA_WV of a weak victim row detected in the test process. The PRHT logic circuit 110 of the memory device 100 may load the weak victim row address RA_WV stored in the fuse array FA.

In operation S113, the memory device 100 may determine a weak aggressor row address RA_WA based on the loaded weak victim row address RA_WV. For example, it is assumed that the first row among the plurality of rows of the memory device 100 corresponds to the weak victim row address RA_WV. In this case, rows that are capable of having a row hammer influence on the first row may include the second row adjacent to the first row. The memory device 100 may determine a row address of the second row as the weak aggressor row address RA_WA.

At least one row may be present between the weak aggressor row and the weak victim row; in this case, the number of at least one row may be determined based on a condition where the weak victim row is affected by the row hammering of the weak aggressor row. However, for convenience of description, below, the description will be given as the weak aggressor row is a row adjacent to the weak victim row, and that the weak aggressor row and the weak victim row are adjacent to each other may mean that any other row is not present between the two rows or at least one row is present between the two rows. In this case, the at least one row may be determined based on the degree of row hammering influence between the weak aggressor row and the weak victim row.

In operation S114, the memory device 100 may adjust a threshold corresponding to the weak aggressor row address RA_WA. For example, the PRHT logic circuit 110 of the memory device 100 may be configured to manage the number of times of activation (or an active count) of each row. In this case, when the active count of the specific row among the plurality of rows reaches the threshold, a row address of a row adjacent to the specific row may be output as a target row address. In this case, the memory device 100 may perform the refresh operation or the row hammer mitigation operation based on the target row address As the memory device 100 sets the threshold of the row corresponding to the weak aggressor row address RA_WA to be relatively small, even though the "actives", the number of which is relatively small, are generated with respect to the weak aggressor row address RA_WA, the weak victim row address RA_WV may be output as the target row address RA_TG. In this case, because the refresh operation or the row hammer mitigation operation is more frequently performed on memory cells with relatively weak cell strength, the reliability of the memory device 100 may be improved.

Various implementations where a threshold corresponding to a weak aggressor row address is adjusted will be described with reference to the following drawings. However, the present disclosure is not limited thereto. For example, it may be understood that the concepts disclosed herein may be variously implemented through each of implementations to be described with reference to the following drawings or a combination of the implementations.

Figure 5:
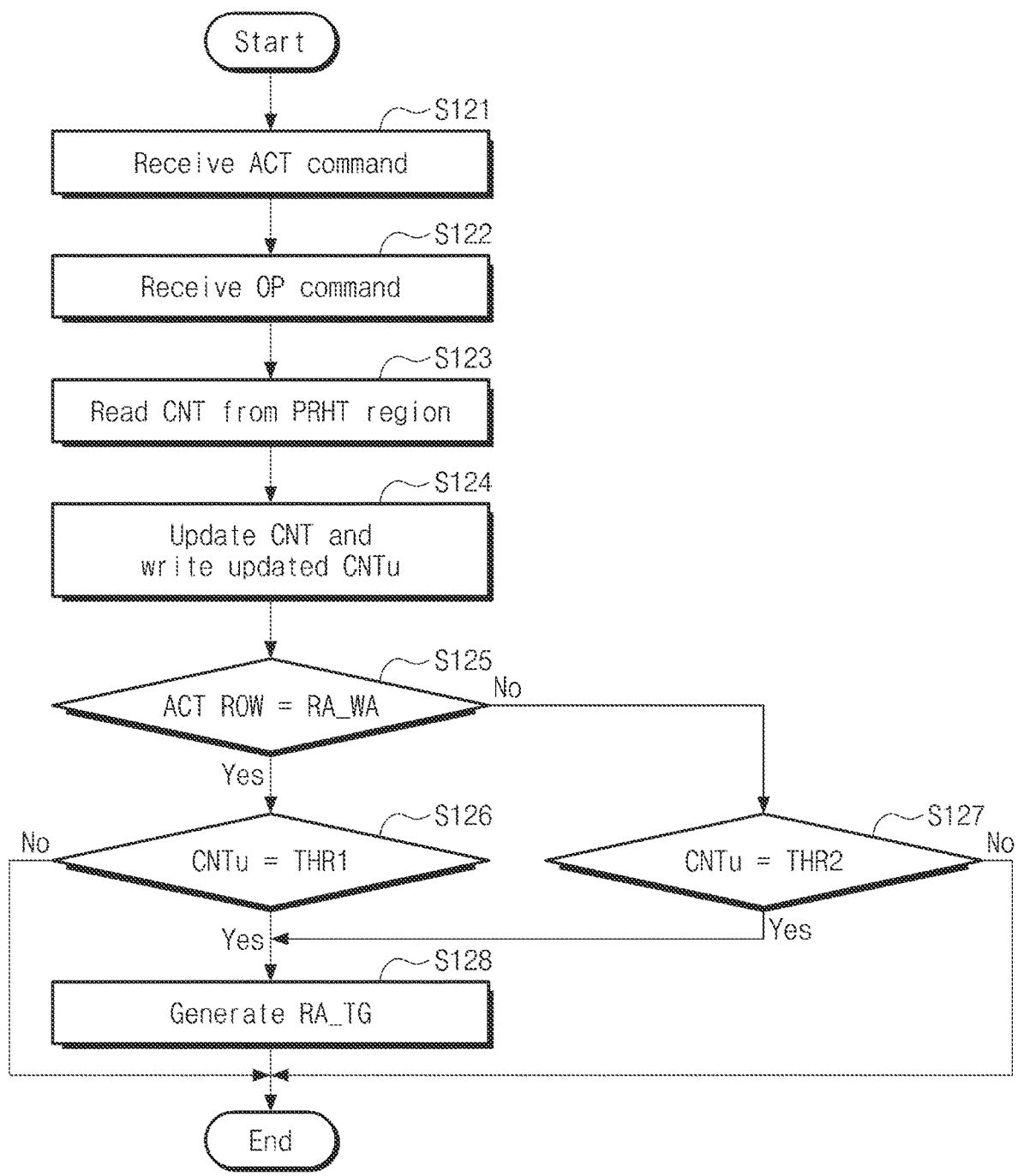
FIG. 5 is another example flowchart illustrating an operation of a memory device of FIG. 2.

FIG. 5 is another example flowchart illustrating an operation of a memory device of FIG. 2. Referring to FIGS. 2 and 5, in operation S121, the memory device 100 may receive the active command ACT from the memory controller 11. In an example, the active command ACT may include a row address of a row targeted for activation from among the plurality of rows of the memory device 100. The memory device 100 may activate the row corresponding to the row address included in the active command ACT. For example, the memory device 100 may apply a wordline voltage (e.g., a voltage sufficient to turn on access transistors of memory cells) to a wordline corresponding to the row address included in the active command ACT.

In operation S122, the memory device 100 may receive an operation command OP from the memory controller 11. In an example, the operation command OP may be a command corresponding to the read operation or the write operation of the memory device 100. The memory device 100 may perform the operation corresponding to the operation command OP.

In operation S123, the memory device 100 may read the count CNT from the PRHT region 121 of the memory cell array 120. For example, it is assumed that the first row is activated by the active command ACT received in operation S121. In this case, the memory device 100 may read the count CNT from memory cells belonging to the first row from among the memory cells of the PRHT region 121. In an example, the count CNT may indicate the number of active commands issued with respect to the first row or the number of times that the first row is activated.

In operation S124, the memory device 100 may update the count CNT and may write an updated count CNTu in the memory cell array 120. For example, the count CNT read from the PRHT region 121 may indicate the number of times that the first row is previously activated. That is, because the "active" is further generated once in operation S121, the count CNT may be updated by adding "1" to the count CNT. The updated count CNTu may be again written in the PRHT region 121 of the memory cell array 120. In an example, the updated count CNTu may be written in memory cells belonging to the same row as the currently activated row from among the memory cells of the PRHT region 121.

In operation S125, the memory device 100 may determine whether a currently activated row ACT_ROW corresponds to the weak aggressor row address RA_WA. For example, as described with reference to FIG. 4, the fuse array FA of the memory device 100 may include the weak victim row address RA_WV, and the memory device 100 may determine the weak aggressor row address RA_WA based on the weak victim row address RA_WV. As such, the memory device 100 may determine whether the currently activated row ACT_ROW corresponds to the weak aggressor row address RA_WA.

When the currently activated row ACT_ROW corresponds to the weak aggressor row address RA_WA, in operation S126, the memory device 100 may determine whether the updated count CNTu reaches a first threshold THR1. In contrast, when the currently activated row ACT_ROW does not correspond to the weak aggressor row address RA_WA, in operation S127, the memory device 100 may determine whether the updated count CNTu reaches a second threshold THR2.

When a determination result in operation S126 indicates that the updated count CNTu reaches the first threshold THR1 or when a determination result in operation S127 indicates that the updated count CNTu reaches the second threshold THR2, in operation S128, the memory device 100 may generate the target row address RA_TG. For example, that the updated count CNTu reaches the first threshold THR1 or the second threshold THR2 means that the probability that data of a row adjacent to the currently activated row ACT_ROW are lost due to the row hammering is high. Accordingly, the memory device 100 may output a row address of the row adjacent to the currently activated row ACT_ROW as the target row address RA_TG. The memory device 100 may perform the refresh operation or the row hammer mitigation operation based on the target row address RA_TG.

In an example, the first threshold THR1 may be smaller than the second threshold THR2. That is, when the currently activated row ACT_ROW corresponds to the weak aggressor row address RA_WA, the refresh operation or the row hammer mitigation operation may be frequently performed on the weak victim row corresponding to the weak victim row address RA_WV.

In an example, when the target row address RA_TG is generated, the updated count CNTu that reaches the corresponding count (i.e., the first threshold THR1 or the second threshold THR2) may be reset to an initial value (e.g., "0"). Alternatively, when the refresh operation or the row hammer mitigation operation is performed with respect to the target row address RA_TG, the updated count CNTu that reaches the corresponding count (i.e., the first threshold THR1 or the second threshold THR2) may be reset to an initial value (e.g., "0").

In an example, when the target row address RA_TG is generated or the refresh operation or the row hammer mitigation operation is performed with respect to the target row address RA_TG, the corresponding count may not be reset separately. For example, it is assumed that the count is a 7-bit count and the threshold is "16". In this case, when four lower bits of the count are "XXX1111", the PRHT logic circuit 110 may determine that the count reaches the threshold. Afterwards, the count may be updated such that it is set to "XX10000"; when the count reaches "XX11111", it may be determined that the count again reaches the threshold.

Figure 6:
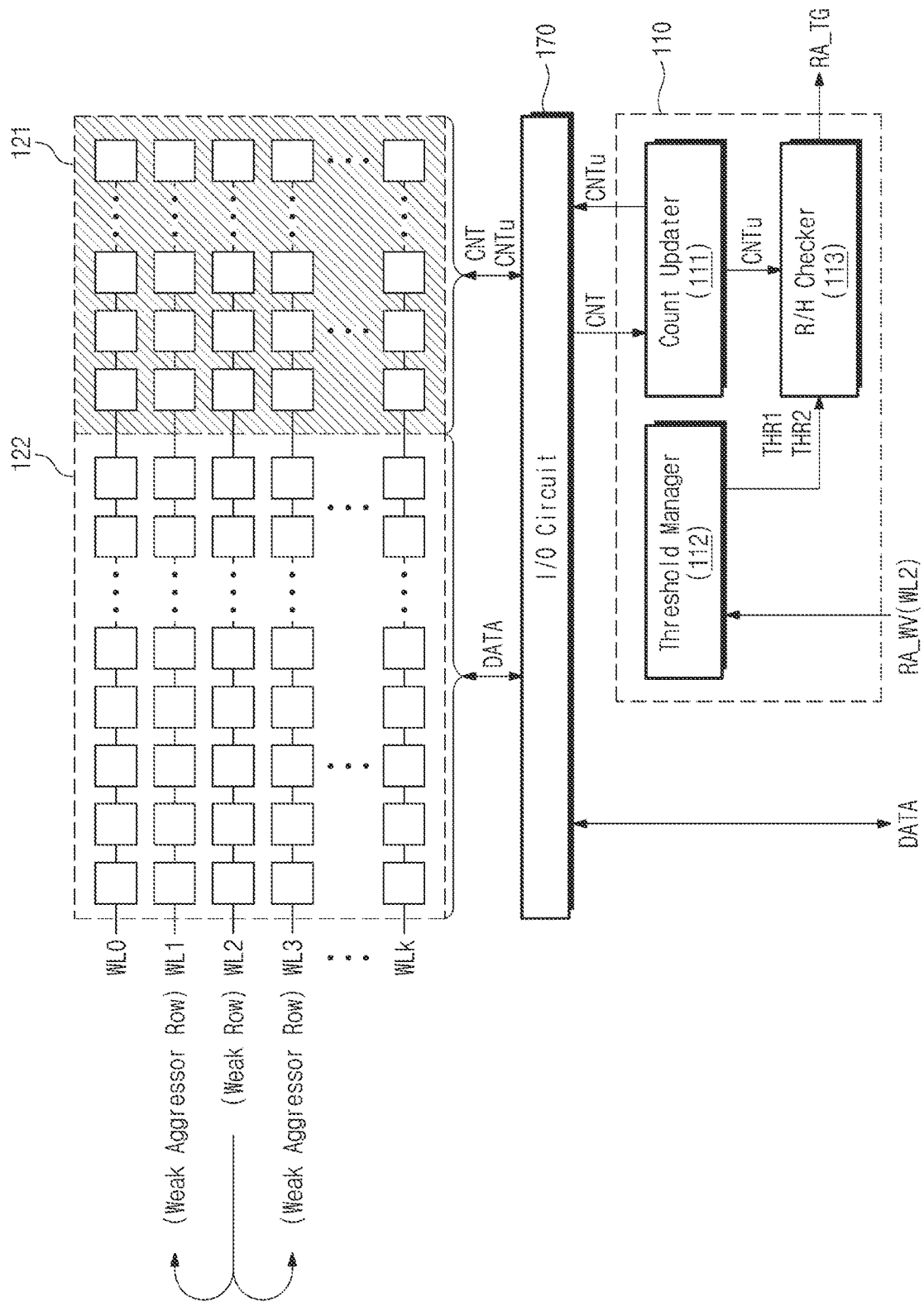
FIG. 6 is an example diagram for describing an operation of a memory device according to the flowchart of FIG. 5.

FIG. 6 is an example diagram for describing an operation of a memory device according to the flowchart of FIG. 5. For convenience of description, components that are unnecessary to describe an operation of a memory device of FIG. 5 are omitted. Also, it is assumed that a row corresponding to the second wordline WL2 is a weak victim row. That is, the row address corresponding to the second wordline WL2 may be stored or set in the fuse array FA as the weak victim row address RA_WV.

Referring to FIGS. 2, 5, and 6, the memory device 100 may include the PRHT logic circuit 110, the memory cell array 120, and the input/output circuit 170. The memory cell array may include the PRHT region 121 and the normal region 122. The plurality of memory cells included in the memory cell array 120 may be connected to a plurality of wordlines WL0 to WLk.

The input/output circuit 170 may store the data "DATA" in the normal region 122 of the memory cell array 120 or may read the data "DATA" from the normal region 122 of the memory cell array 120. The input/output circuit 170 may exchange the data "DATA" with the memory controller 11.

The input/output circuit 170 may read the count CNT from the PRHT region 121 of the memory cell array 120 and may provide the read count CNT to the PRHT logic circuit 110. The input/output circuit 170 may receive the updated count CNTu from the PRHT logic circuit 110 and may write the updated count CNTu in the PRHT region 121 of the memory cell array 120.

The PRHT logic circuit 110 may include a count updater 111, a threshold manager 112, and a row hammer checker 113. The count updater 111 may receive the count CNT from the input/output circuit 170. For example, when a specific wordline among the plurality of wordlines WL0 to WLk is activated, the input/output circuit 170 may read the count CNT from memory cells connected to the specific wordline from among the memory cells of the PRHT region 121. In an example, the count CNT may refer to the number of times of activation of the specific wordline or the specific row. The read count CNT may be provided to the count updater 111. The count updater 111 may update the count CNT by adding "1" to the count CNT. The count updater 111 may provide the updated count CNTu to the input/output circuit 170. The input/output circuit 170 may write the updated count CNTu in the memory cells connected to the specific wordline (i.e., the memory cells from which the count CNT is read). According to the above operation of the count updater 111, the number of times of activation of each of the wordlines WL0 to WLk may be individually managed and stored.

The threshold manager 112 may receive the weak victim row address RA_WV from the fuse array FA. The threshold manager 112 may selectively output the first threshold THR1 or the second threshold THR2 based on the weak victim row address RA_WV. For example, as in the above description, the threshold manager 112 may determine the weak aggressor row address RA_WA based the weak victim row address RA_WV. When the currently activated row corresponds to the weak aggressor row address RA_WA, the threshold manager 112 may output the first threshold THR1; when the currently activated row does not correspond to the weak aggressor row address RA_WA, the threshold manager 112 may output the second threshold THR2. In an example, the first threshold THR1 may be smaller than the second threshold THR2.

The row hammer checker 113 may receive the updated count CNTu from the count updater 111 and may receive the first threshold THR1 or the second threshold THR2 from the threshold manager 112. The row hammer checker 113 may determine whether the updated count CNTu reaches the first threshold THR1 or the second threshold THR2. The row hammer checker 113 may generate the target row address RA_TG based on a determination result.

Figure 7A:
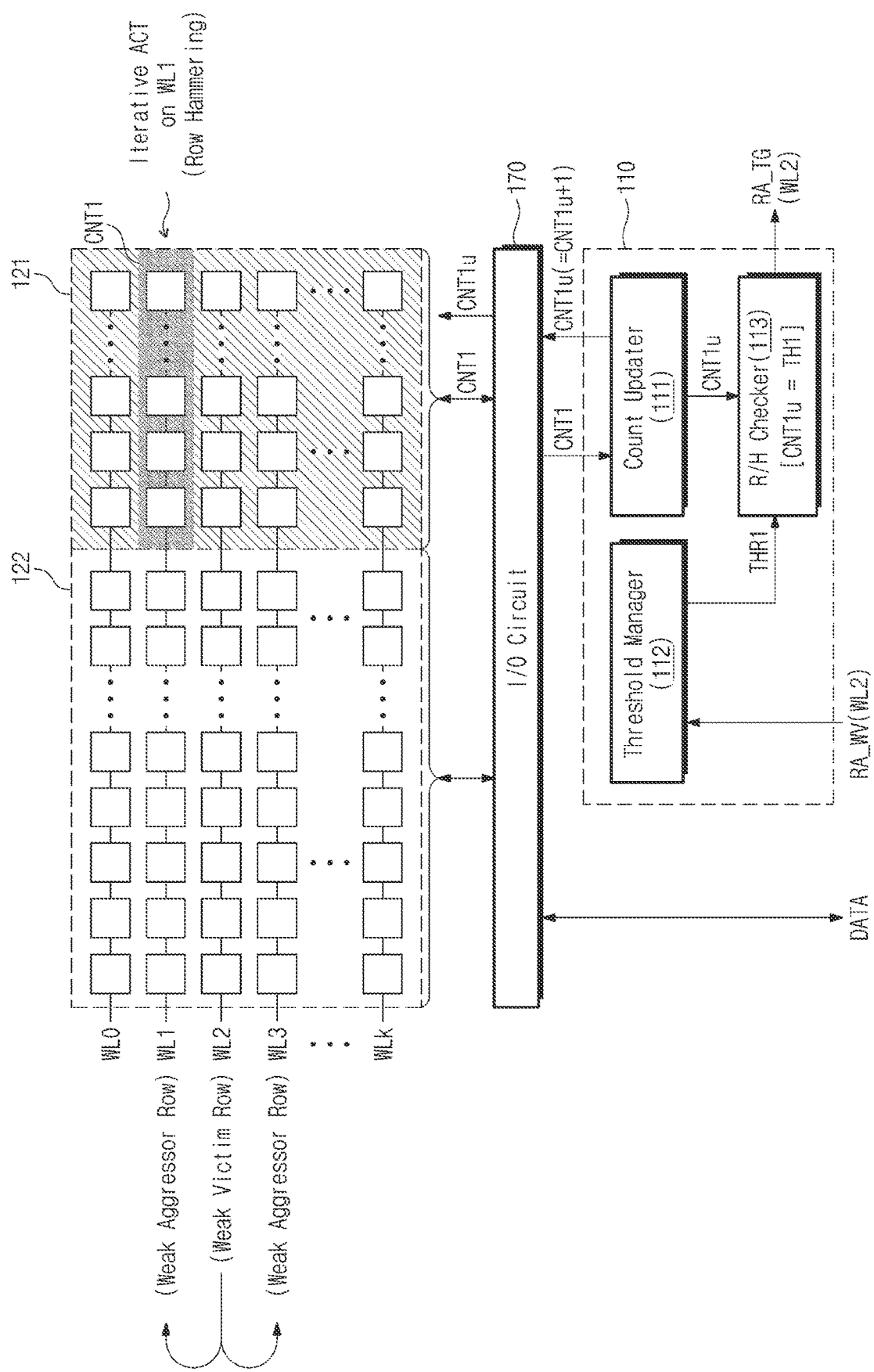
FIGS. 7A and 7B are example diagrams for describing an operation of a memory device of FIG. 6 in detail.
Figure 7B:
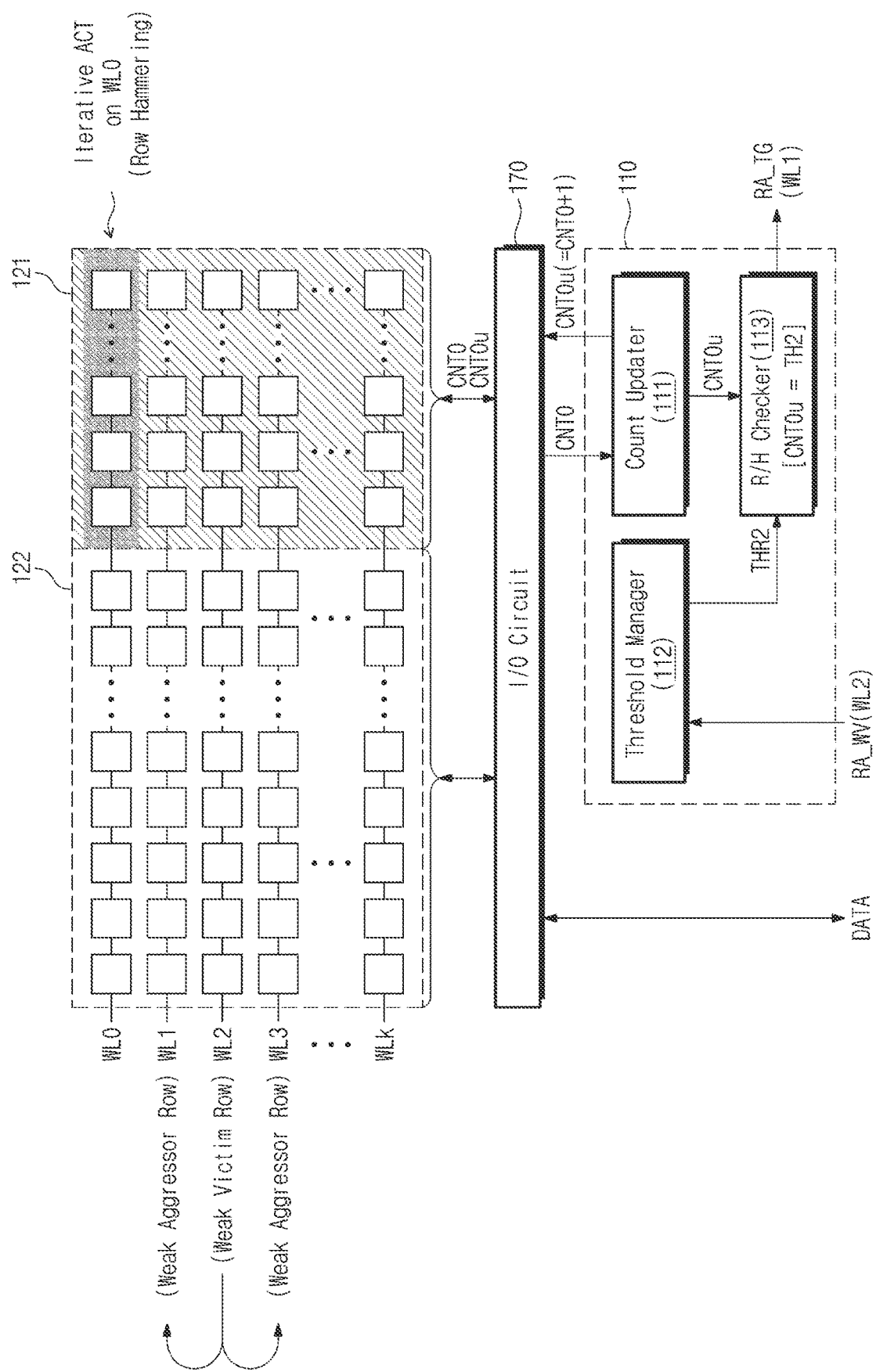

FIGS. 7A and 7B are example diagrams for describing an operation of a memory device of FIG. 6 in detail. Referring to FIGS. 6, 7A, and 7B, the memory device 100 may include the PRHT logic circuit 110, the memory cell array 120, and the input/output circuit 170. The memory cell array 120 may include the PRHT region 121 and the normal region 122. The plurality of cells included in the memory cell array 120 may be connected to the plurality of wordlines WL0 to WLk.

In an example, the weak victim row address RA_WV may correspond to the second wordline WL2. In this case, the first and third wordlines WL1 and WL3 adjacent to the second wordline WL2 may correspond to weak aggressor rows.

First, as illustrated in FIG. 7A, the first wordline WL1 may be repeatedly activated. That is, the first wordline WL1 may experience row hammering.

In this case, whenever the first wordline WL1 is activated, the count updater 111 may update a first count CNT1 read from memory cells connected to the first wordline WL1 from among the memory cells of the PRHT region 121 and may write a first updated count CNT1u in the same memory cells. That is, the first count CNT1 may increase one by one whenever the first wordline WL1 is activated.

The threshold manager 112 may determine the weak aggressor row address RA_WA based on the weak victim row address RA_WV. In the example of FIG. 7A, because the weak victim row address RA_WV is the row address of the second wordline WL2, the weak aggressor row address RA_WA may be the row address of the first wordline WL1 or the third wordline WL3. In this case, because the currently activated row (i.e., the first wordline WL1) corresponds to the weak aggressor row address RA_WA, the threshold manager 112 may output the first threshold THR1.

When the first wordline WL1 is activated, the row hammer checker 113 may receive the first updated count CNT1u from the count updater 111 and may receive the first threshold THR1 from the threshold manager 112. The row hammer checker 113 may determine whether the first updated count CNT1u reaches the first threshold THR1. When the first updated count CNT1u reaches the first threshold THR1, the row hammer checker 113 may output the target row address RA_TG. In an example, the target row address RA_TG may include the row address of the wordline (e.g., the second wordline WL2) adjacent to the wordline (i.e., the first wordline WL1) corresponding to the activated row.

Then, as illustrated in FIG. 7B, the 0-th wordline WL0 may be repeatedly activated. That is, the 0-th wordline WL0 may experience row hammering.

In this case, whenever the 0-th wordline WL0 is activated, the count updater 111 may update a 0-th count CNT0 read from memory cells connected to the 0-th wordline WL0 from among the memory cells of the PRHT region 121 and may write a 0-th updated count CNT0u in the same memory cells. That is, the 0-th count CNT0 may increase one by one whenever the 0-th wordline WL0 is activated.

The threshold manager 112 may determine the weak aggressor row address RA_WA based on the weak victim row address RA_WV. In the example of FIG. 7B, because the weak victim row address RA_WV is the row address of the second wordline WL2, the weak aggressor row address RA_WA may be the row address of the first wordline WL1 or the third wordline WL3. In this case, because the currently activated row (i.e., the 0-th wordline WL0) does not correspond to the weak aggressor row address RA_WA, the threshold manager 112 may output the second threshold THR2. In an example, the second threshold THR2 may be greater than the first threshold THR1 described with reference to FIG. 7A.

When the 0-th wordline WL0 is activated, the row hammer checker 113 may receive the 0-th updated count CNT0u from the count updater 111 and may receive the second threshold THR2 from the threshold manager 112. The row hammer checker 113 may determine whether the 0-th updated count CNT0u reaches the second threshold THR2. When the 0-th updated count CNT0u reaches the second threshold THR2, the row hammer checker 113 may output the target row address RA_TG. In an example, the target row address RA_TG may include the row address of the wordline (e.g., the first wordline WL1) adjacent to the wordline (i.e., the 0-th wordline WL0) corresponding to the activated row.

Figure 8:
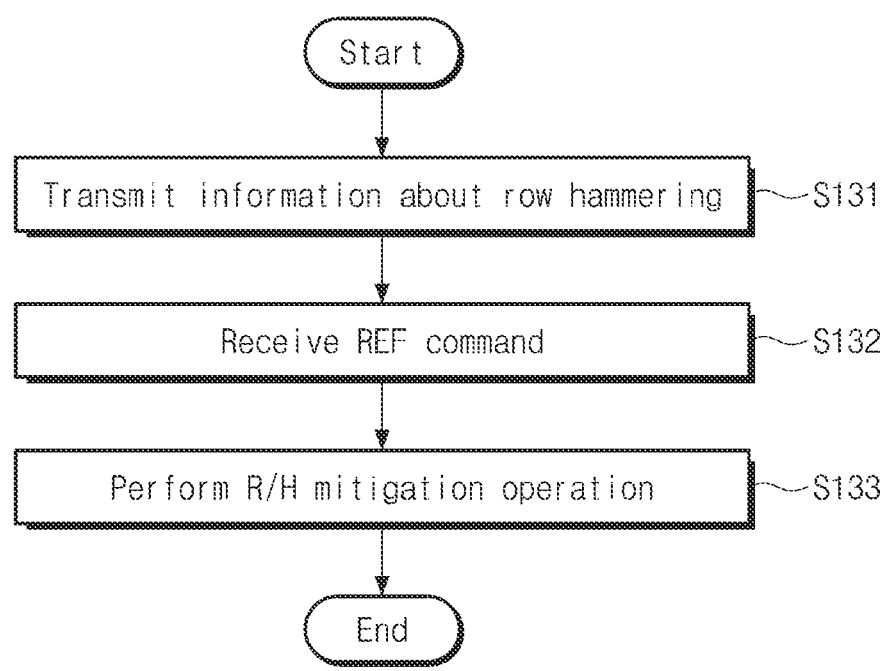
FIG. 8 is an example flowchart illustrating a refresh operation (or a row hammer mitigation operation) of a memory device of FIG. 2.

FIG. 8 is an example flowchart illustrating a refresh operation (or a row hammer mitigation operation) of a memory device of FIG. 2. Referring to FIGS. 2 and 8, in operation S131, the memory device 100 may transmit information about row hammering to the memory controller 11. For example, according to the above implementations, the memory device 100 may generate the target row address RA_TG. That is, when row hammering on the specific row in the memory device 100 occurs, the row hammer mitigation operation may be required.

When row hammering is detected, the memory device 100 may transmit the information about row hammering to the memory controller 11. In an example, the memory device 100 may transmit the information about row hammering to the memory controller 11 through one of various control signals CTRL. For example, the memory device 100 may transmit the information about row hammering to the memory controller 11 through an alert signal Alert_n. Alternatively, the memory device 100 may transmit the information about row hammering to the memory controller 11 through an error signal. However, the present disclosure is not limited thereto. For example, the information about row hammering may be transmitted from the memory device 100 to the memory controller 11 through various manners.

In operation S132, the memory device 100 may receive the refresh command REF from the memory controller 11. In an example, the memory controller 11 may issue the refresh command REF in response to the information about row hammering. Alternatively, the memory controller 11 may periodically issue the refresh command REF based on an operating characteristic of the memory device 100. In an example, the refresh command REF received in operation S132 may be a command for the row hammer mitigation operation.

In operation S133, the memory device 100 may perform the row hammer mitigation operation in response to the refresh command REF. For example, the memory device 100 may perform the row hammer mitigation operation on the row corresponding to the target row address RA_TG in response to the refresh command REF. In an example, the row hammer mitigation operation may be substantially similar to the refresh operation except that the row address is generated by the PRHT logic circuit 110.

As described above, the memory device 100 may manage and store the active count (or the number of times of activation) for each row. The memory device 100 may prevent data from be lost due to row hammering by comparing the active count for each row with the threshold. In an example, the memory device 100 may adjust the threshold depending on a state of each row such that the row hammer mitigation operation (or the refresh operation) is frequently performed on memory cells with relatively weak cell strength. In an example, the state of each row may be detected through the test operation associated with the memory device 100. For example, when the memory device 100 is tested, rows (i.e., weak victim rows) including memory cells with relatively weak cell strength from among the plurality of rows may be detected, and row addresses corresponding to the weak victim rows may be stored in the fuse array FA of the memory device 100 as weak victim row addresses. The memory device 100 may adjust the above threshold based on the information stored in the fuse array FA.

Accordingly, because the refresh operation (or the row hammer mitigation operation) is more frequently performed only on memory cells with relatively weak cell strength, the reliability of the memory device 100 may be improved, and the reduction of performance of the memory device 100 may be prevented.

Figure 9B:
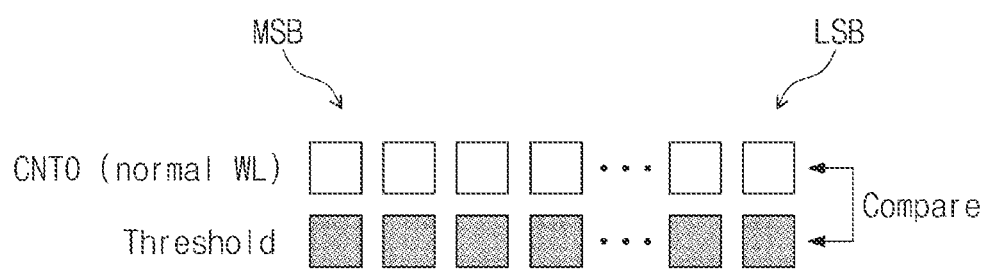
Figure 9B:
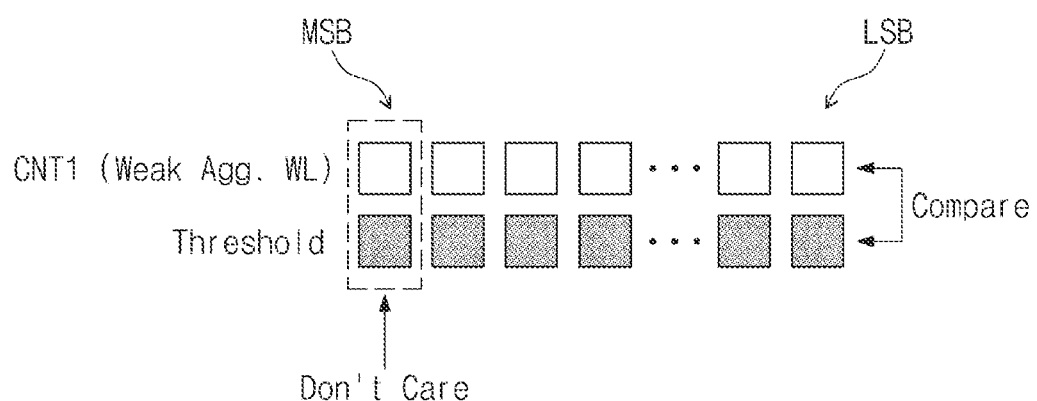

FIGS. 9A and 9B are example diagrams for describing an operation of a memory device of FIG. 2. Referring to FIGS. 2, 9A, and 9B, the memory device 100 may include a PRHT logic circuit 110a, the memory cell array 120, and the input/output circuit 170. The memory cell array 120 may include the PRHT region 121 and the normal region 122. Functions and operations of the memory cell array 120, the PRHT region 121, the normal region 122, and the input/output circuit 170 are similar to those described above, and thus, additional description will be omitted to avoid redundancy.

The implementations in which the PRHT logic circuit 110 changes the threshold for specific rows (e.g., weak aggressor rows) based on the weak victim row address RA_WV are described with reference to FIGS. 7A and 7B. However, the present disclosure is not limited thereto.

For example, as illustrated in FIG. 9A, the PRHT logic circuit 110a may include the count updater 111, a threshold manager 112a, and a row hammer checker 113a. The count updater 111 may be configured to update the count CNT of the activated row and to generate the updated count CNTu.

The threshold manager 112a may output the threshold THR that is used to determine row hammering. In the example of FIG. 9A, the threshold manager 112a may not adjust the threshold THR separately. That is, the threshold THR output from the threshold manager 112a may have a fixed value.

The row hammer checker 113a may receive the updated count CNTu from the count updater 111 and may receive the threshold THR from the threshold manager 112a. The row hammer checker 113a may receive the weak victim row address RA_WV from the fuse array FA. As in the above description, the row hammer checker 113a may determine weak aggressor rows based on the weak victim row address RA_WV. In the example of FIG. 9A, when the weak victim row address RA_WV corresponds to the second wordline WL2, the weak aggressor rows may correspond to the first wordline WL1 and the third wordline WL3.

The row hammer checker 113a may compare only some bits of the count CNT corresponding to the weak aggressor row with the threshold THR. For example, each of the count CNT (or the updated count CNTu) and the threshold THR may include a plurality of bits. The row hammer checker 113a may determine whether the count CNT reaches the threshold THR, by comparing the bits of the count CNT (or the updated count CNTu) with the bits of the threshold THR, respectively. In an example, the row hammer checker 113a may compare some bits of the bits of the count CNT associated with the weak aggressor row with some bits of the bits of the threshold THR, respectively. In this case, even though the actual value of the count CNT of the weak aggressor row is smaller than the threshold THR, it may be determined that the count CNT reaches the threshold THR.

For example, as illustrated in FIG. 9B, each of the 0-th count CNT0 and the first count CNT1 may include a plurality of bits. The 0-th count CNT0 may indicate the number of times that the 0-th wordline WL0 (i.e., a normal wordline or a normal row) is activated, and the first count CNT1 may indicate the number of times that the first wordline WL1 (i.e., a weak aggressor wordline or a weak aggressor row) is activated.

In this case, the row hammer checker 113a may compare the plurality of bits (i.e., all the bits from LSB to MSB or some bits) of the 0-th count CNT0 with the plurality of bits of the threshold THR, respectively. For example, it is assumed that the 0-th count CNT0 is a 9-bit binary code and the threshold THR is a 9-bit binary code where all the bits are "1" (i.e., "all-one"). According to the above assumption, when a result of a bit-wise XOR operation of the 0-th count CNT0 and the threshold THR indicates "all-zero", it may be determined that the 0-th count CNT0 reaches the threshold THR.

In contrast, the row hammer checker 113a may compare some bits (e.g., the remaining bits other than MSB) of the plurality of bits of the first count CNT1 with some bits (e.g., the remaining bits other than MSB) of the plurality of bits of the threshold THR, respectively. In the example of FIG. 9B, the row hammer checker 113a may omit MSB comparison. In this case, even though the actual value of the first count CNT1 does not reach the threshold THR, it may be determined that the first count CNT1 reaches the threshold THR. For example, it is assumed that the first count CNT1 is a 9-bit binary code and the threshold THR is a 9-bit binary code where all the bits are "1" (i.e., "all-one"). In this case, the first count CNT1 may increase one by one whenever the first wordline WL1 is activated. According to the above description the first count CNT1 may have a value of "011111111". That is, because the MSB comparison is omitted, a result of the bit-wise XOR operation of some bits of the first count CNT1 and some bits of the threshold THR may be "all-zero". That is, even though the actual value of the first count CNT1 is smaller than the threshold THR, it may be determined that the first count CNT1 reaches the threshold THR.

As described above, in the case of comparing the count of the weak aggressor row with the threshold THR, the row hammer checker 113a may omit comparison or calculation for a specific bit (e.g., MSB or any other bits). In this case, even though the actual value of the count of the weak aggressor row is smaller than the threshold THR, it may be determined that the count reaches the threshold THR, and thus, the refresh operation or the row hammer mitigation operation of the weak victim row may be performed more frequently.

Figure 10:
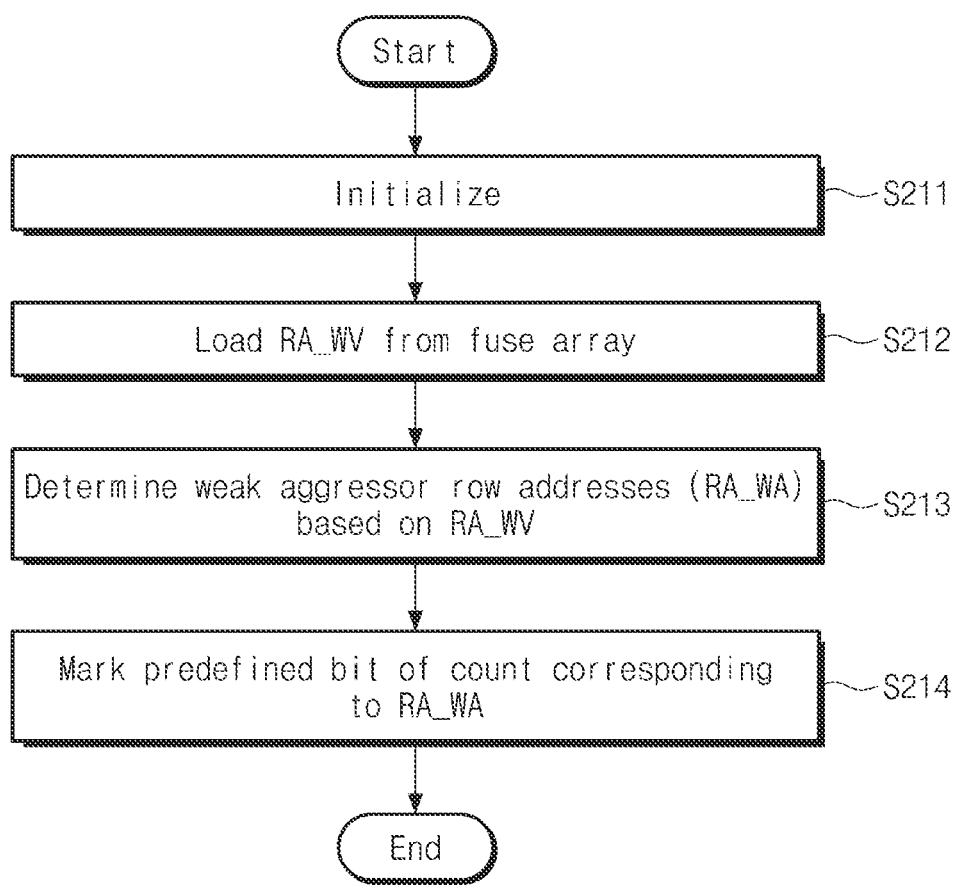
FIG. 10 is another example flowchart illustrating an operation of a memory device of FIG. 2.

FIG. 10 is another example flowchart illustrating an operation of a memory device of FIG. 2. Referring to FIGS. 2 and 10, the memory device 100 may perform operation S211 to operation S213. Operation S211 to operation S213 are similar to operation S111 to operation S113 of FIG. 4, and thus, additional description will be omitted to avoid redundancy.

In operation S214, the memory device 100 may mark a predefined bit of the count CNT based on the weak aggressor row address RA_WA. For example, the memory device 100 may mark or set a specific bit of the count CNT corresponding to the weak aggressor row address RA_WA with a predefined value. In this case, even though the actual value of the count CNT corresponding the weak aggressor row address RA_WA is smaller than the threshold THR, it may be determined that the count CNT reaches the threshold THR. Accordingly, the memory device 100 may more frequently perform the refresh operation or the row hammer mitigation operation with respect to weak victim rows.

Figure 11A:
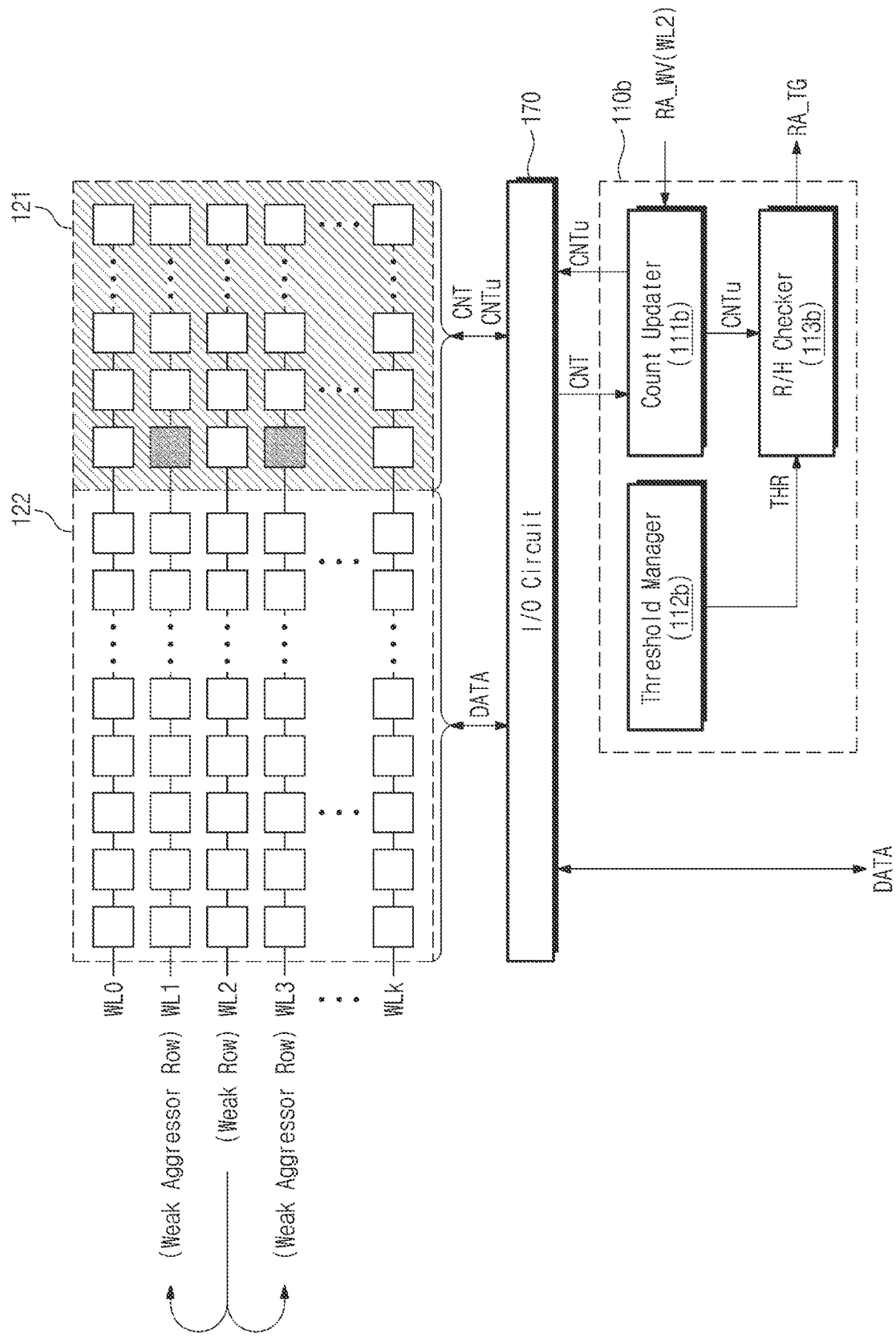
FIGS. 11A and 11B are example diagrams for describing an operation of a memory device according to the flowchart of FIG. 10.
Figure 11B:
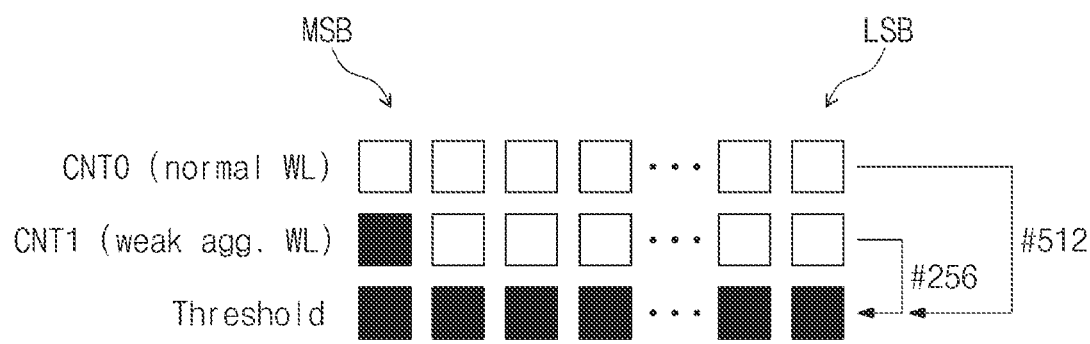

FIGS. 11A and 11B are example diagrams for describing an operation of a memory device according to the flowchart of FIG. 10. Referring to FIGS. 10, 11A, and 11B, the memory device 100 may include a PRHT logic circuit 110b, the memory cell array 120, and the input/output circuit 170.

The memory cell array 120 may include the PRHT region 121 and the normal region 122. The memory cell array 120, the PRHT region 121, the normal region 122, and the input/output circuit 170 are similar to those described above, and thus, additional description will be omitted to avoid redundancy.

The PRHT logic circuit 110b may receive the weak victim row address RA_WV from the fuse array FA and may mark specific bits of the PRHT region 121 based on the received weak victim row address RA_WV.

For example, the PRHT logic circuit 110b may include a count updater 111b, a threshold manager 112b, and a row hammer checker 113b. The count updater 111b may determine the weak aggressor row address RA_WA based on the weak victim row address RA_WV. For example, when the weak victim row address RA_WV corresponds to the second wordline WL2, the weak aggressor row address RA_WA may correspond to the first and third wordlines WL1 and WL3 adjacent to the second wordline WL2. The count updater 111b may mark or set a specific bit (e.g., MSB) of the count CNT corresponding to the weak aggressor row address RA_WA with a predefined value.

The threshold manager 112b and the row hammer checker 113b are described above, and thus, additional description will be omitted to avoid redundancy.

In the example of FIG. 11A, because the specific bit of the count CNT corresponding to the weak aggressor row address RA_WA always coincides with the specific bit of the threshold THR, even though the actual value of the count CNT (i.e., the number of times that the corresponding row is activated) does not reach the threshold THR, it may be determined that the count CNT reaches the threshold THR. As such, as in the above description, the refresh operation or the row hammer mitigation operation may be more frequently performed with respect to the weak victim row address RA_WV.

For example, as illustrated in FIG. 11B, each of the 0-th count CNT0 and the first count CNT1 may include a plurality of bits LSB to MSB. It is assumed that each of the 0-th count CNT0 and the first count CNT1 is a 9-bit binary code. It is assumed that the threshold THR is a 9-bit binary code where all the bits are "1" (i.e., "all-one"). In an example, the count updater 111b may mark or set a specific bit (e.g., MSB) of the first count CNT1 corresponding to the weak aggressor row address RA_WA with a predefined value. In this case, when the first count CNT1 increases to "256", the first count CNT1 may coincide with the threshold THR; when the first count CNT1 increases to "512", the 0-th count CNT0 may coincide with the threshold THR.

In other words, when the 0-th wordline WL0 being a normal wordline is activated 512 times, the target row address RA_TG may be generated. However, when the first wordline WL1 corresponding to the weak aggressor row address RA_WA is activated 256 times, the target row address RA_TG may be generated. Accordingly, the refresh operation or the row hammer mitigation operation may be more frequently performed with respect to the weak victim row address RA_WV.

In an example, when the refresh operation or the row hammer mitigation operation is performed with respect to the target row address RA_TG, the count CNT corresponding to the target row address RA_TG may be reset. In this case, the PRHT logic circuit 110b may reset the count CNT such that a specific bit of the count CNT corresponding to the weak aggressor row address RA_WA is marked or set with a predefined value.

Figure 12:
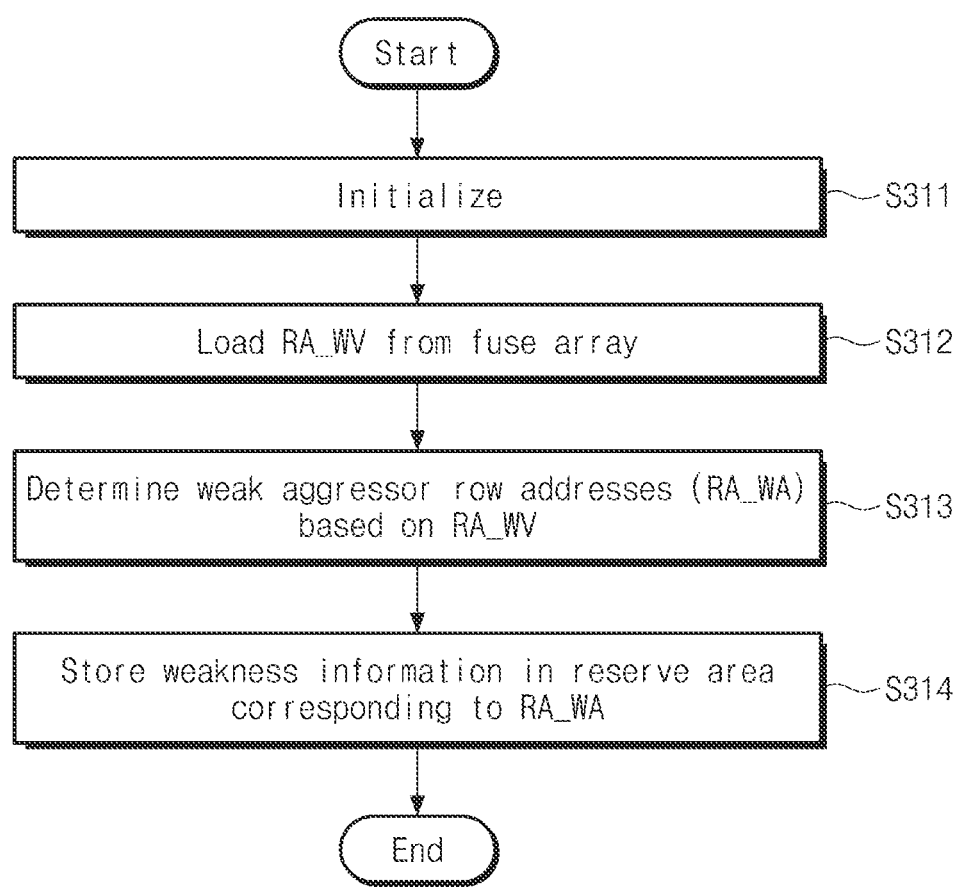
FIG. 12 is another example flowchart illustrating an operation of a memory device of FIG. 2.
Figure 13:
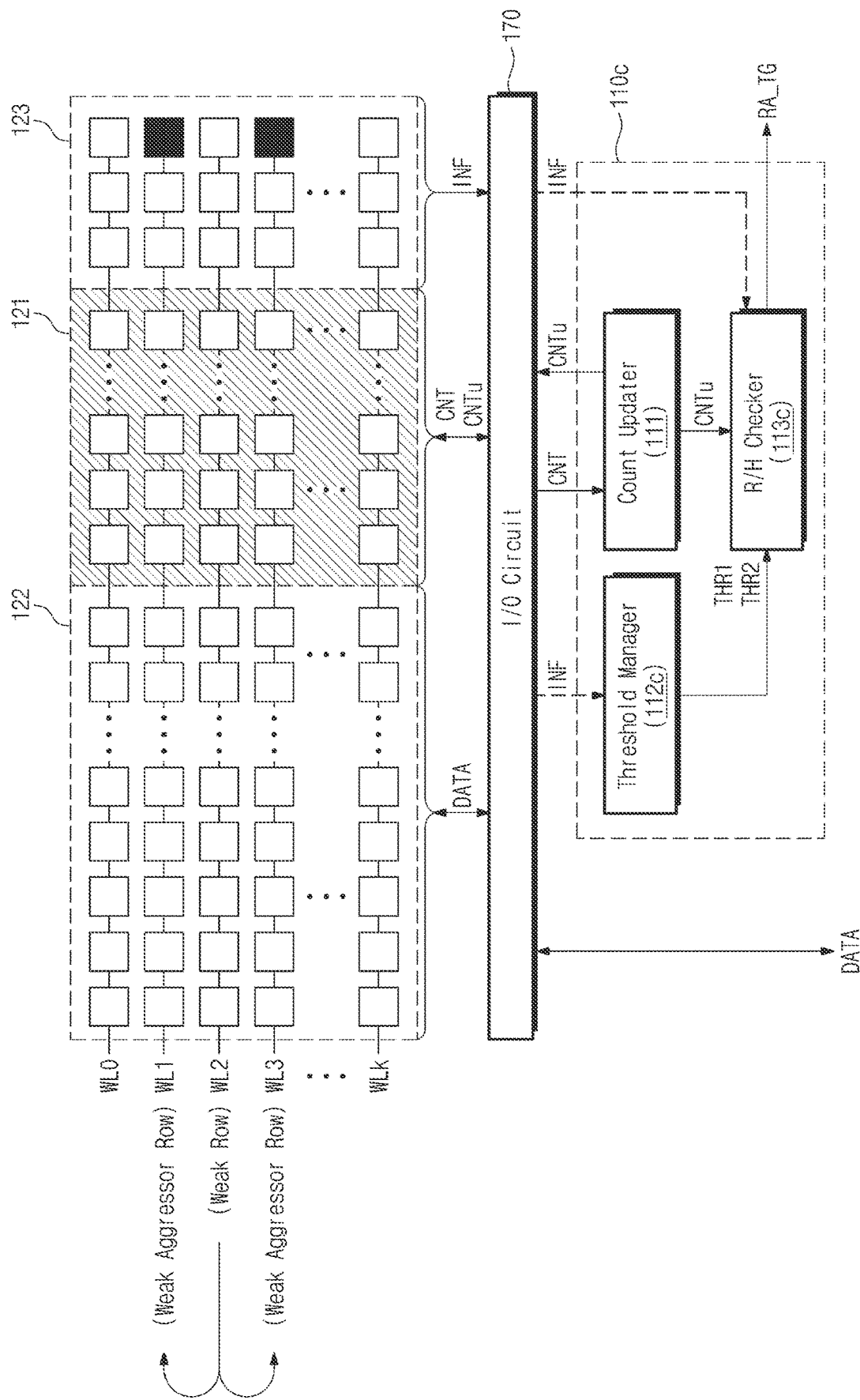
FIG. 13 is an example diagram for describing an operation according to the flowchart of FIG. 12.

FIG. 12 is another example flowchart illustrating an operation of a memory device of FIG. 2. FIG. 13 is an example diagram for describing an operation according to the flowchart of FIG. 12. Referring to FIGS. 2, 12, and 13, the memory device 100 may perform operation S311 to operation S313. Operation S311 to operation S313 are similar to operation S111 to operation S113 of FIG. 4, and thus, additional description will be omitted to avoid redundancy.

In operation S314, the memory device 100 may store weakness information indicating a weak aggressor row in a reserved region corresponding to the weak aggressor row address RA_WA. For example, as illustrated in FIG. 13, the memory device 100 may include a PRHT logic circuit 110c, a memory cell array 120c, and the input/output circuit 170.

The memory cell array 120c may include the PRHT region 121, the normal region 122, and a reserved region 123. The PRHT region 121 and the normal region 122 are similar to those described above, and thus, additional description will be omitted to avoid redundancy.

The reserved region 123 may be configured to store a variety of information about the memory cell array 120c. For example, the reserved region 123 may be configured to store weakness information INF indicating whether the corresponding row or the corresponding wordline is a weak aggressor row. In detail, in the example of FIG. 13, when the weak victim row address RA_WV corresponds to the second wordline WL2, the first and third wordlines WL1 and WL3 may be weak aggressor rows. In this case, the weakness information INF indicating a weak aggressor row may be written in memory cells connected to the first and third wordlines WL1 and WL3 from among the memory cells of the reserved region 123. In an example, the weakness information INF may be set in the initialization process or the reset process of the memory device 100. The weakness information INF corresponding to one row or one wordline may include one or more bits.

The weakness information INF may be provided to the PRHT logic circuit 110c through the input/output circuit 170. The PRHT logic circuit 110c may change the threshold THR for determining row hammering, based on the weakness information INF. For example, the PRHT logic circuit 110c may include the count updater 111, a threshold manager 112c, and a row hammer checker 113c.

The count updater 111 may receive the count CNT of the PRHT region 121 from the input/output circuit 170 and may update the count CNT. The updated count CNTu may be written in the PRHT region 121 through the input/output circuit 170.

The threshold manager 112c or the row hammer checker 113c may determine row hammering by using weakness information INF.

For example, the threshold manager 112c may be configured to manage the threshold for determining row hammering. For example, the threshold manager 112c may receive the weakness information INF from the input/output circuit 170 and may determine whether the currently activated row is a weak aggressor row, based on the weakness information INF. When the currently activated row is a weak aggressor row, the threshold manager 112 may output the first threshold THR1; when the currently activated row is not a weak aggressor row, the threshold manager 112 may output the second threshold THR2. The first threshold THR1 may be smaller than the second threshold THR2. In this case, the row hammer checker 113c may operate to be similar to that described with reference to FIGS. 7A and 7B.

Alternatively, the threshold manager 112c may output only the fixed threshold THR. In this case, the row hammer checker 113c may determine whether the currently activated row is a weak aggressor row, based on the weakness information INF. When the currently activated row is a weak aggressor row, the row hammer checker 113c may compare the count CNT with the threshold THR in a state where the comparison of the specific bit (e.g., MSB) of the count CNT with the specific bit of the threshold THR is omitted. This is similar to that described with reference to FIGS. 9A and 9B, and thus, additional description will be omitted to avoid redundancy.

As described above, the memory cell array 120 of the memory device 100 may include the reserved region 123. The reserved region 123 may include a plurality of memory cells connected to a plurality of wordlines. The reserved region 123 may store the weakness information INF indicating whether the corresponding wordline is a weak aggressor row. The weakness information INF may be used by the PRHT logic circuit 110c.

In an example, the reserved region 123 may further include additional information as well as the weakness information INF. For example, the reserved region 123 may include information about a refresh time of the corresponding wordline. However, the present disclosure is not limited thereto. For example, the reserved region 123 may further include a variety of information necessary for the operation of the memory device 100.

Figure 14:
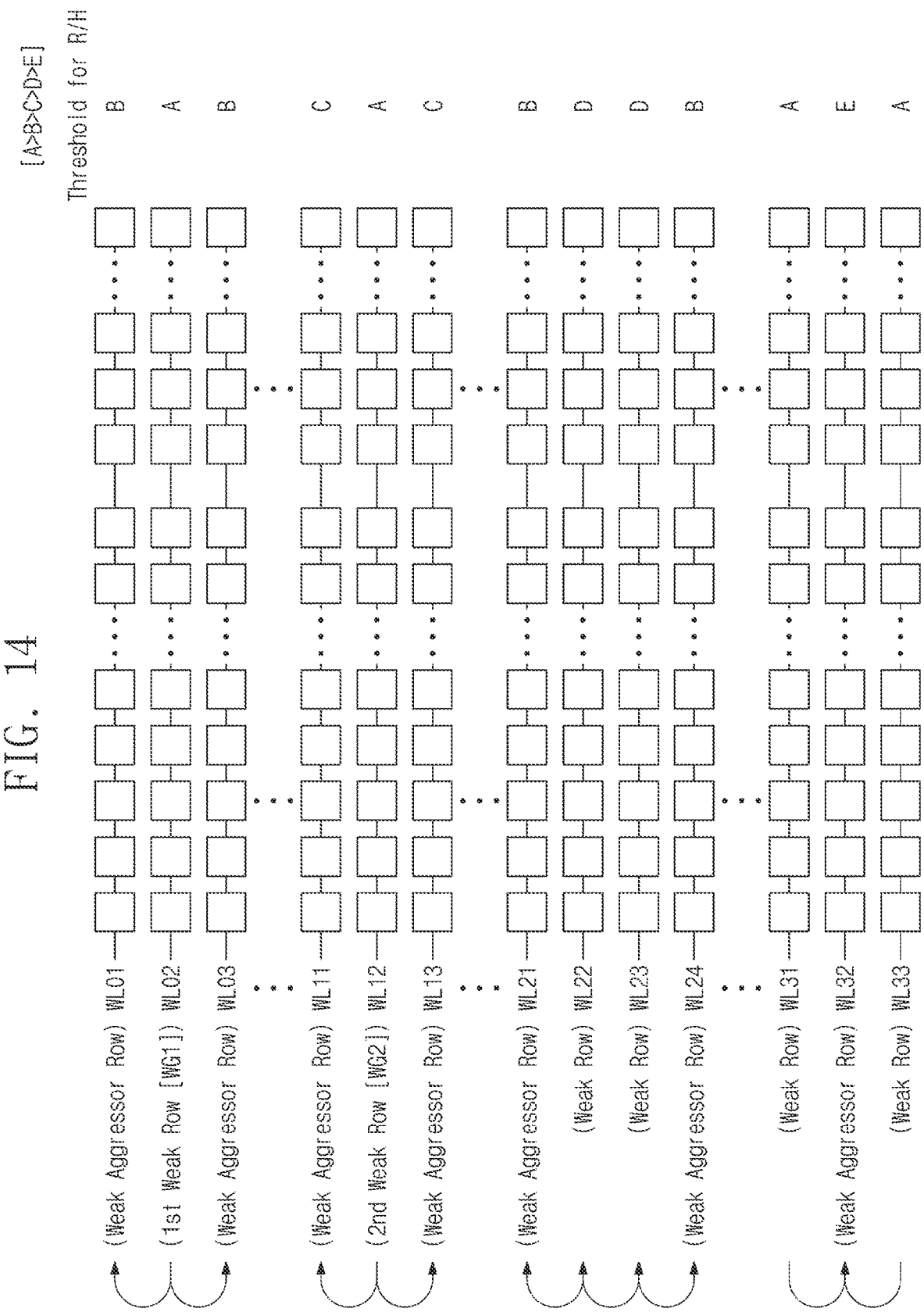
FIG. 14 is a diagram for describing various examples where a threshold for determining row hammering is changed.

FIG. 14 is a diagram for describing various examples where a threshold for determining row hammering is changed. In the above implementations, the description is given as the first threshold THR1 for weak aggressor rows and the second threshold THR2 for normal rows are used as the threshold THR for determining row hammering (THR2>THR1). However, the present disclosure is not limited thereto. For example, the threshold for determining row hammering may be variously changed or modified.

For example, as illustrated in FIG. 14, the second wordline WL02 may be a weak victim row, and the first and third wordlines WL01 and WL03 adjacent to the second wordline WL02 may be weak aggressor rows. In this case, the threshold THR for the second wordline WL02 may be set to "A", and the threshold THR of the first and third wordlines WL01 and WL03 may be set to "B". In an example, "B" may be smaller than "A".

The 12th wordline WL12 may be a weak victim row, and the 11th and 13th wordlines WL11 and WL13 adjacent to the 12th wordline WL12 may be weak aggressor rows. In this case, the threshold THR for the 12th wordline WL12 may be set to "A", and the threshold THR of the 11th and 13th wordlines WL11 and WL13 may be set to "C". In an example, "C" may be smaller than "A".

In an example, weak victim rows may be classified into weak groups. For example, the second wordline WL02 may belong to the first weak group WG1, and the 12th wordline WL12 may belong to a second weak group WG2. Compared to the first weak group WG1, the second weak group WG2 may include rows or wordlines including memory cells with relatively weaker cell strength. That is, the memory cells included in the second weak group WG2 may be more vulnerable to row hammering than the memory cells included in the first weak group WG1. Accordingly, the threshold for rows including memory cells with relatively weaker cell strength may be set to a relatively smaller value. That is, as illustrated in FIG. 14, "C" may be set to be smaller than "B". In this case, compared to the second wordline WL2, the refresh operation may be more frequently performed with respect to the 12th wordline WL12 including memory cells with relatively weaker cell strength.

In an example, the 22nd and 23th wordlines WL22 and WL23 may be wordlines adjacent to each other and may be weak victim rows. In this case, the 21st and 23th third wordlines WL21 and WL23 adjacent to the 22nd wordline WL22 may be weak aggressor rows in terms of the 22nd wordline WL22. The 22nd and 24th wordlines WL22 and WL24 adjacent to the 23th wordline WL23 may be weak aggressor rows in terms of the 23th wordline WL23. In this case, the threshold THR for the 21st and 24th wordlines WL21 and WL24 may be set to "B", and the threshold THR of the 22nd and 23th wordlines WL22 and WL23 may be set to "D". In an example, "D" may be smaller than "B".

In an example, the 31st and 33th wordlines WL31 and WL33 may be weak victim rows. In this case, the 32nd wordline WL32 adjacent to the 31st and 33th wordlines WL31 and WL33 may be a weak aggressor row. In this case, the threshold THR for the 31st and 33th wordlines WL31 and WL33 may be set to "A", and the threshold THR for the 32nd wordline WL32 may be set to "E". In an example, "E" may be smaller than "A".

In the example of FIG. 14, the thresholds "A", "B", "C", "D", and "E" according to the above scenarios are provided as an example, and the present disclosure is not limited thereto. In an example, information about the magnitude of the threshold of the weak aggressor row may be expressed by a plurality of bits and may be stored in the reserved region 123 described with reference to FIG. 13, the fuse array FA, or a separate memory circuit.

In an example, the thresholds "A", "B", "C", "D", and "E" according to the above scenarios or information about the magnitudes of the thresholds "A", "B", "C", "D", and "E" may be stored in a separate managing circuit or a memory circuit. For example, information about thresholds according to various scenarios may be set or designated by the memory controller 11 or the memory device 100 through a mode register.

Figure 15:
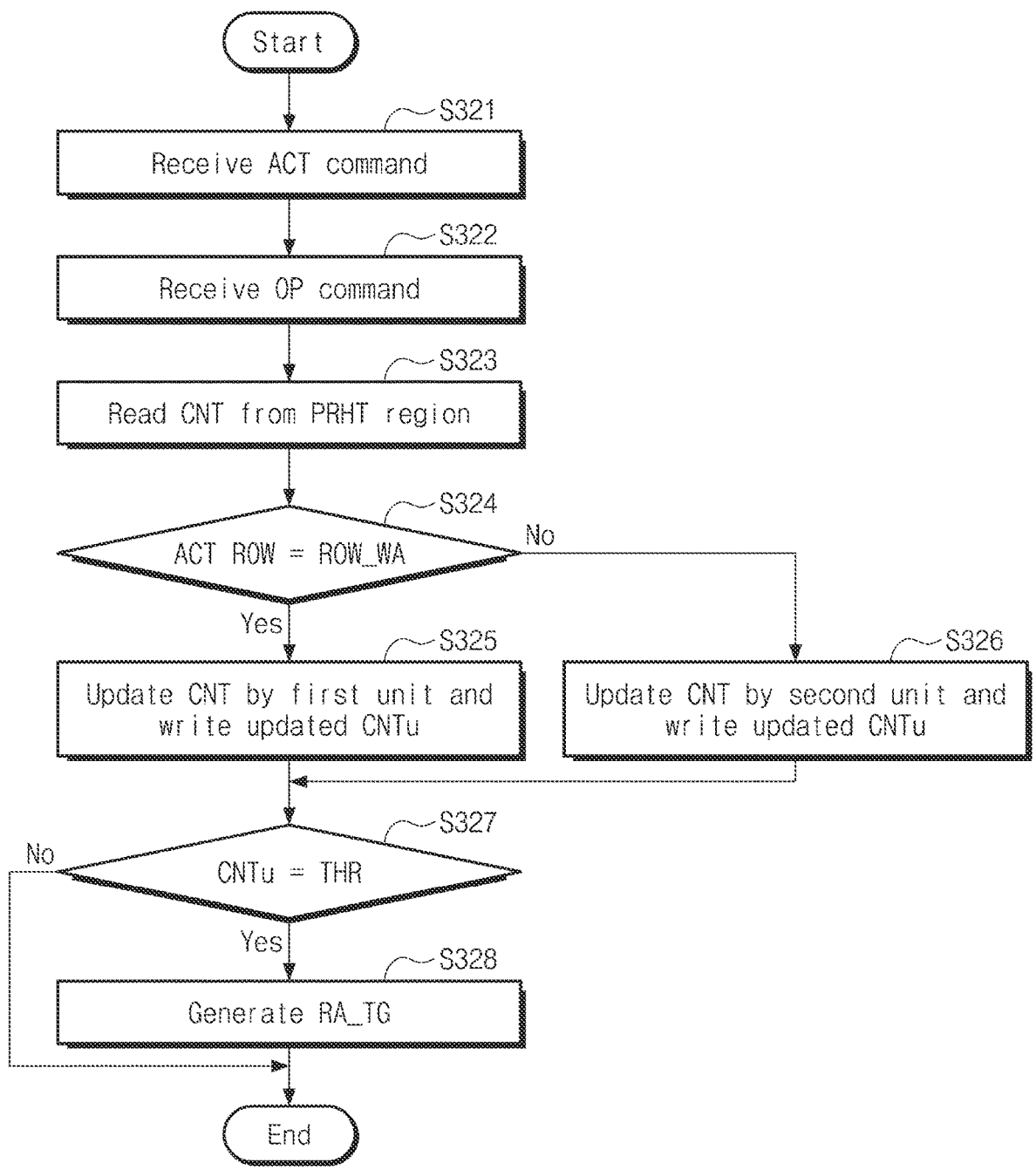
FIG. 15 is another example flowchart illustrating an operation of a memory device of FIG. 2.

FIG. 15 is another example flowchart illustrating an operation of a memory device of FIG. 2. Referring to FIGS. 2 and 15, the memory device 100 may perform operation S321 to operation S323. Operation S321 to operation S323 are similar to operation S121 to operation S123, and thus, additional description will be omitted to avoid redundancy.

In operation S324, the memory device 100 may determine whether the currently activated row is a weak aggressor row. For example, the PRHT logic circuit 110 of the memory device 100 may determine weak aggressor rows based on the weak victim row address RA_WV.

When the currently activated row is a weak aggressor row, in operation S325, the memory device 100 may update the count CNT read from the PRHT region 121 so as to be set to a first unit and may write the updated count CNTu in the PRHT region 121. When the currently activated row is not a weak aggressor row, in operation S326, the memory device 100 may update the count CNT read from the PRHT region 121 so as to be set to a second unit and may write the updated count CNTu in the PRHT region 121.

Afterwards, in operation S327, the memory device 100 may determine whether the updated count CNTu reaches the threshold THR. When it is determined that the updated count CNTu reaches the threshold THR, in operation S328, the memory device 100 may generate the target row address RA_TG. When it is determined that the updated count CNTu does not reach the threshold THR, the procedure may end without performing a separate operation.

In an example, the first unit may be greater than the second unit. For example, when the currently activated row is a weak aggressor row, the count CNT may increase as much as "2". In contrast, when the currently activated row is not a weak aggressor row, the count CNT may increase as much as "1". That is, when the currently activated row is a weak aggressor row and is activated "n times", the count CNT may have a value of "2n". When the currently activated row is not a weak aggressor row and is activated "n times", the count CNT may have a value of "n". In this case, even though the updated count CNTu is compared with the fixed threshold THR, because the update unit of the count CNT for the weak aggressor row is greater than the update unit of the count CNT for a row being not the weak aggressor row, the active count that is used to determine row hammering may be variable. Accordingly, the same effect as the above implementations may be implemented by adjusting the update unit of the count CNT based on the weak victim row address RA_WV.

Figure 16:
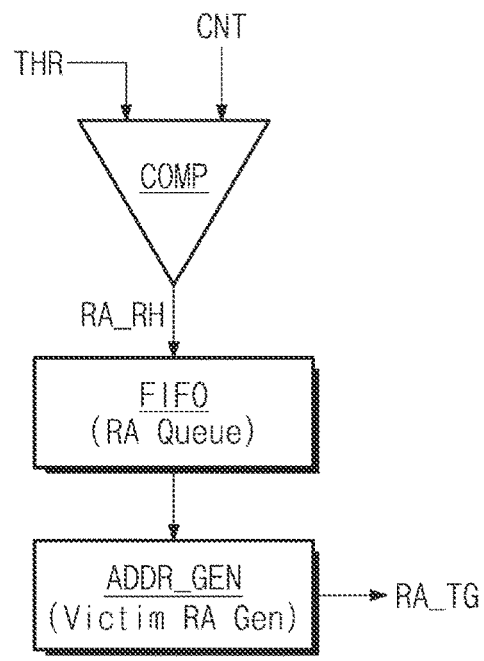
FIG. 16 is a diagram illustrating an example of a row hammer checker of FIG. 6.

FIG. 16 is a diagram illustrating an example of a row hammer checker of FIG. 6. A configuration in which the row hammer checker 113 generates the target row address RA_TG will be described with reference to FIG. 16, but the present disclosure is not limited thereto.

Referring to FIGS. 6 and 16, the row hammer checker 113 may include a comparator COMP, a first-input first-out circuit FIFO, and an address generator ADDR_GEN. The comparator COMP may receive the count CNT (or the updated count CNTu) from the count updater 111 and may receive the threshold THR from the threshold manager 112. In an example, the first or second threshold THR1 or THR2 described with reference to FIGS. 6 to 7B and 13, the fixed threshold THR described with reference to FIGS. 8 to 11B, or a variable threshold described with reference to FIG. 14 may be provided as the threshold THR depending on the way to implement.

The comparator COMP may determine whether the count CNT reaches the threshold THR. For example, the comparator COMP may compare the plurality of bits of the count CNT with the plurality of bits of the threshold THR or may perform the XOR operation on the plurality of bits of the count CNT with the plurality of bits of the threshold THR. In an example, as described above, the comparator COMP may compare some of the bits of the count CNT with some of the bits of the threshold THR or may perform the XOR operation on some of the bits of the count CNT with some of the bits of the threshold THR.

When it is determined that the count CNT reaches the threshold THR, the comparator COMP may output a row hammer row address RA_RH. That the count CNT reaches the threshold THR means that there is the probability that data of rows or wordlines adjacent to a row or wordline corresponding to the count CNT are lost due to row hammering on the row or wordline corresponding to the count CNT. That is, when it is determined that the count CNT reaches the threshold THR, a row address corresponding to the activated row may be output as the row hammer row address RA_RH. The row hammer row address RA_RH may be provided to the first-input first-out circuit FIFO.

In an example, the first-input first-out circuit FIFO may be a row address queue configured to store the row hammer row address RA_RH. The first-input first-out circuit FIFO may sequentially output the row hammer row addresses RA_RH in the order of receiving the row hammer row addresses RA_RH.

The address generator ADDR_GEN may receive the row hammer row address RA_RH from the first-input first-out circuit FIFO and may generate the target row address RA_TG based on the row hammer row address RA_RH. For example, the row hammer row address RA_RH corresponds to a row on which row hammering occurs (i.e., a row whose active count reaches a threshold). In this case, because data of rows adjacent to the row on which row hammering occurs are lost, there is a need to perform the refresh operation on the adjacent rows, not the row on which row hammering occurs. Accordingly, the address generator ADDR_GEN may output an address of a row adjacent to the row corresponding to the row hammer row address RA_RH as the target row address RA_TG.

Figure 17:
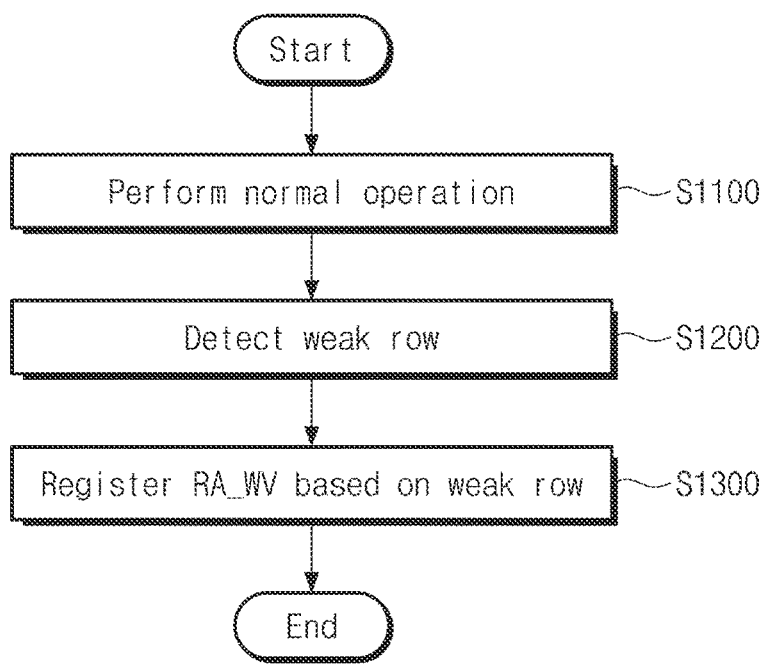
FIG. 17 is an example flowchart illustrating an operation of a memory controller of FIG. 1.

FIG. 17 is an example flowchart illustrating an operation of a memory controller of FIG. 1. Referring to FIGS. 1 and 17, in operation S1100, the memory controller 11 may perform a normal operation. For example, the memory controller 11 may perform the normal operation (e.g., a read operation or a write operation) of the memory device 100.

In operation S1200, the memory controller 11 may detect a weak victim row in the memory device 100. For example, the memory controller 11 may detect the weak victim row based on a data error or fault occurring in the process of driving the memory device 100. In an example, the memory controller 11 may read the count CNT stored in the PRHT region 121 from the memory device 100 and may determine the cell strength of memory cells included in a row corresponding to the count CNT.

In operation S1300, the memory controller 11 may register the weak victim row address RA_WV at the fuse array FA of the memory device 100, based on a weak victim row. Afterwards, the memory device 100 may perform the above operation (i.e., may change a threshold for determining row hammering) based on the weak victim row address RA_WV additionally stored.

In an example, the memory controller 11 may receive the weak victim row address RA_WV from the memory device 100 and may control the access to the memory device 100 based on the received information. For example, when the access to specific data is focused, the memory controller 11 may control the memory device 100 based on the weak victim row address RA_WV such that the access to the weak victim row address RA_WV is not focused. In this case, the number of row hammer mitigation operations may decrease. In an example, the memory controller 11 may receive the weak victim row address RA_WV from the memory device 100 through various operations including the MPR operation.

As described above, the threshold for determining row hammering may vary depending on the cell strength of memory cells of the memory device 100. In this case, the refresh operation may be more frequently performed with respect to rows including memory cells with relatively weak cell strength, and the refresh operation may be less frequently performed with respect to rows including memory cells with relatively strong cell strength. Accordingly, the reliability and performance of the memory device 100 may be improved.

Figure 18:
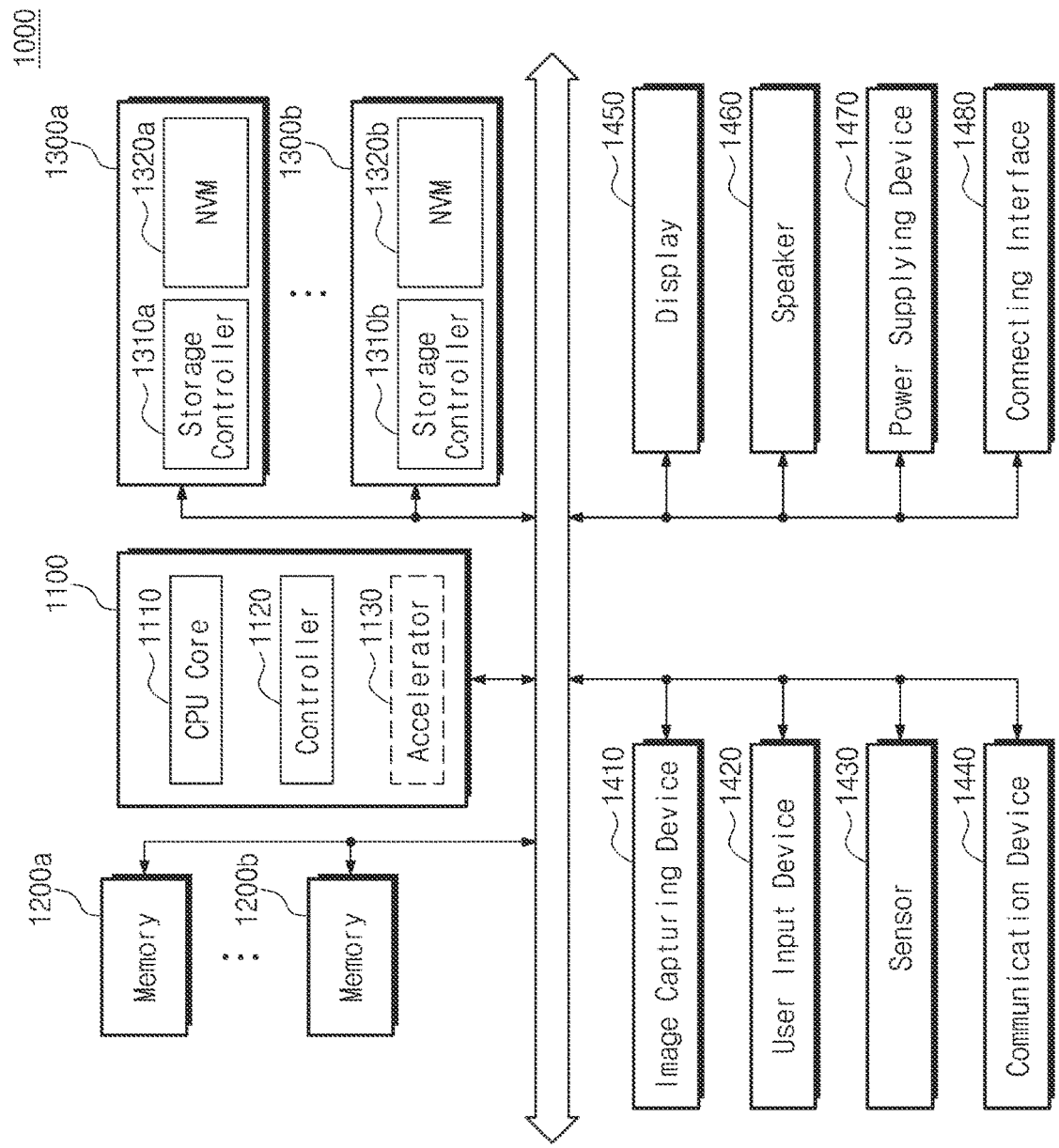
FIG. 18 is a diagram illustrating an example of a system to which a storage device is applied.

FIG. 18 is a diagram of an example of a system 1000 to which a storage device is applied. The system 1000 of FIG. 18 may basically be a mobile system, such as a portable communication terminal (e.g., a mobile phone), a smartphone, a tablet personal computer (PC), a wearable device, a healthcare device, or an Internet of things (IOT) device. However, the system 1000 of FIG. 18 is not necessarily limited to the mobile system and may be a PC, a laptop computer, a server, a media player, or an automotive device (e.g., a navigation device).

Referring to FIG. 18, the system 1000 may include a main processor 1100, memories (e.g., AAA200a and AAA200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some implementations, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRLs) 1310a and 1310b and NVMs (Non-Volatile Memories) 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may have types of solid-state devices (SSDs) or memory cards and be removably combined with other components of the system 1000 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

In an example, the memories 1200a and 1200b of FIG. 18 may include the memory device described with reference to FIGS. 1 to 17. The memories 1200a and 1200b of FIG. 18 may operate based on the operation method described with reference to FIGS. 1 to 17. In an example, the main processor 1100 of FIG. 18 may include the memory controller configured to control the memory device described with reference to FIGS. 1 to 17.

According to the present disclosure, a memory device may include a per-row hammer tracking (PRHT) logic circuit. The PRHT logic circuit may manage an active count for each row of the memory device. The PRHT logic circuit may change a threshold for determining row hammering depending on the cell strength for each row. In this case, because the refresh operation or the row hammer mitigation operation is more frequently performed with respect to rows with relatively weak cell strength, the reliability of the memory device may be improved. Also, because the refresh operation or the row hammer mitigation operation is less frequently performed with respect to rows with relatively strong cell strength, the reliability of the memory device may be improved. Accordingly, a memory device with improved reliability and improved performance and an operation method thereof are provided.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

While the present disclosure has been described with reference to implementations thereof, it will be apparent to those of ordinary skill in the art that various changes and modifications may be made thereto without departing from the spirit and scope of the present disclosure as set forth in the following claims.

What is claimed is:

1. An operation method of a memory device that includes a plurality of rows, each row including a plurality of memory cells, the method comprising:
   receiving an active command for a first row of the plurality of rows from a memory controller;
   reading a first count from a per-row hammer tracking (PRHT) region of the first row;
   updating the first count to generate a first updated count;
   comparing the first updated count with one of a first threshold and a second threshold greater than the first threshold based on the first row and a given row to generate a comparison result, wherein when the first row is adjacent to the given row, the first updated count is compared with the first threshold and when the first row is not adjacent to the given row, the first updated count is compared with the second threshold;
   outputting a target row address corresponding to the first row based on the comparison result; and
   performing a row hammer mitigation operation on a row corresponding to the target row address.

2. The method of claim 1, further comprising:
   rewriting the first updated count in the PRHT region of the first row.

3. The method of claim 1, wherein performing the row hammer mitigation operation on the row corresponding to the target row address includes:
   transmitting row hammering information to the memory controller in response to generating the target row address;
   receiving a refresh command from the memory controller; and
   performing the row hammer mitigation operation in response to the refresh command.

4. The method of claim 1, further comprising:
   when the target row address corresponding to the first row is generated, resetting the first updated count.

5. The method of claim 1, wherein outputting the target row address corresponding to the first row based on the comparison result includes:
   when the first updated count reaches the first threshold or the second threshold, storing a first row address of the first row in a row address queue; and
   outputting the target row address based on the first row address stored in the row address queue.

6. The method of claim 1, wherein the given row is determined based on an address stored in a fuse array of the memory device.

7. The method of claim 1, wherein at least one memory cell among the plurality of memory cells of the first row stores information indicating that the first row is the given row.

8. The method of claim 7, wherein the at least one memory cell is included in a reserved region.

9. An operation method of a memory device, the method comprising:
- generating a first count by counting a number of times a first row is activated, wherein the first row comprises a plurality of first memory cells;
- when the first count reaches a first threshold, performing a row hammer mitigation operation on a first adjacent row, the first adjacent row being adjacent to the first row;
- generating a second count by counting a number of times a second row is activated, wherein the second row comprises a plurality of second memory cells; and
- when the second count reaches a second threshold smaller than the first threshold, performing the row hammer mitigation operation on a second adjacent row, the second adjacent row being adjacent to the second row.

10. The method of claim 9, wherein the plurality of second memory cells have a weaker cell strength than the plurality of first memory cells.

11. The method of claim 9, further comprising:
- storing the first count in at least one first memory cell among the plurality of first memory cells; and
- storing the second count in at least one second memory cell among the plurality of second memory cells.

12. The method of claim 11, wherein the at least one first memory cell and the at least one second memory cell are connected to a same bitline.

13. The method of claim 11, further comprising:
- storing information, which indicates that the second row is a weak aggressor row, in the at least one second memory cell.

14. The method of claim 11, further comprising:
- storing information, which indicates that the second row is a weak aggressor row, in reserved memory cells among the plurality of second memory cells of the second row.

15. The method of claim 9, further comprising:
- generating a third count by counting a number of times a third row is activated, wherein the third row comprises a plurality of third memory cells; and
- when the third count reaches a third threshold different from the first threshold and the second threshold, performing the row hammer mitigation operation on a third adjacent row adjacent to the third row.

16. A memory device comprising:
- first normal memory cells connected to a first wordline and configured to store user data;
- first per-row hammer tracking (PRHT) memory cells connected to the first wordline and configured to store a first count indicating a number of times the first wordline is activated;
- an input/output circuit connected to the first normal memory cells and the first PRHT memory cells through a plurality of bitlines;
- a memory circuit configured to store information about a weak victim row address;
- a PRHT logic circuit configured to receive the first count from the input/output circuit, when the first wordline is activated, to update the first count, to compare the first updated count with a threshold, and to output a row address of a second wordline adjacent to the first wordline as a target row address; and
- a refresh managing circuit configured to perform a refresh operation with respect to the second wordline based on the target row address,
- wherein the PRHT logic circuit adjusts the threshold based on information about the weak victim row address.

17. The memory device of claim 16, wherein the memory circuit is a fuse array configured to further store a fault row address for a repair operation.

18. The memory device of claim 16, wherein the information about the weak victim row address stored in the memory circuit is transmitted to a memory controller through the input/output circuit.

19. The memory device of claim 17, wherein the PRHT logic circuit includes:
- a count updater configured to update the first count when the first wordline is activated;
- a threshold manager configured to adjust the threshold based on the weak victim row address; and
- a row hammer checker configured to compare the first updated count with the adjusted threshold and to output the target row address.

20. The memory device of claim 17, wherein the PRHT logic circuit includes:
- a count updater configured to update the first count when the first wordline is activated;
- a threshold manager configured to output the threshold; and
- a row hammer checker configured to compare the first updated count with the threshold based on the weak victim row address and to output the target row address.

* * * * *